(12) United States Patent
Yoshikawa et al.

(10) Patent No.: US 7,458,917 B2
(45) Date of Patent: Dec. 2, 2008

(54) WORK VEHICLE WITH A SPEED CHANGE DEVICE

(75) Inventors: Kenji Yoshikawa, Osaka (JP); Nobuyuki Okabe, Izumi (JP)

(73) Assignee: Kubota Corporation, Osaka (JP)

( * ) Notice: Subject to any disclaimer, the term of this patent is extended or adjusted under 35 U.S.C. 154(b) by 175 days.

(21) Appl. No.: 11/221,420

(22) Filed: Sep. 7, 2005

(65) Prior Publication Data

US 2006/0185457 A1  Aug. 24, 2006

(30) Foreign Application Priority Data

Feb. 18, 2005 (JP) ............................. 2005-042303
Mar. 7, 2005 (JP) ............................. 2005-062302

(51) Int. Cl.
*B60W 10/10* (2006.01)

(52) U.S. Cl. ......................................... 477/115; 74/335

(58) Field of Classification Search ................... 74/335, 74/473.18; 477/115; 701/52
See application file for complete search history.

(56) References Cited

U.S. PATENT DOCUMENTS 6,371,886 B1 * 4/2002 Sawa et al. .................. 477/115
6,503,170 B1 * 1/2003 Tabata ......................... 477/97
6,740,006 B2 * 5/2004 Tabata ......................... 477/118
7,001,307 B2 * 2/2006 Matsunaga et al. .......... 477/118

FOREIGN PATENT DOCUMENTS

JP  2002-106697  4/2002

* cited by examiner

*Primary Examiner*—Ha D. Ho
(74) *Attorney, Agent, or Firm*—The Webb Law Firm

(57) ABSTRACT

A work vehicle with a speed change device, comprises, a plurality of wheels including at least one driven wheel; an engine for driving the driven wheel; a speed change device provided between the driven wheel and the engine; and automatic shifting mechanism. The automatic shifting mechanism is capable of operating the speed change device to a lower speed position within an automatic shifting range having a predetermined range and is capable of operating the speed change device up to a speed position which the speed change device was in before an operation to the lower speed position was effected, in response to load on the engine. The entirety of the automatic shifting range is changeable to a low speed side and to a high speed side, or the automatic shifting range can be widened to include more speed positions and narrowed to include less speed positions.

10 Claims, 16 Drawing Sheets

WORK VEHICLE WITH A SPEED CHANGE DEVICE

BACKGROUND OF THE INVENTION

As disclosed by the Japanese Publication No. 2002-106697 (FIGS. 1, 2, 4 and 6), for example, a conventional work vehicle is constructed to operate a propelling speed change device automatically to a low speed side and a high speed side in response to loads acting on the engine.

This work vehicle detects an actual engine speed for determining a load acting on the engine. When the actual engine speed lowers, the propelling speed change device is operated to the low speed side. When the actual engine speed rises, the propelling speed change device is operated to the high speed side. By operating the propelling speed change device to the low speed side and high speed side, the actual engine speed is maintained in a set range (i.e. the load acting on the engine is maintained in a set range).

Generally, with a work vehicle, it is necessary to set a proper running speed according to the type of implement connected to the vehicle, and conditions of the operating ground.

SUMMARY OF THE INVENTION

The object of this invention is provide a work vehicle constructed to operate a propelling speed change device to a low speed side and a high speed side according to loads acting on an engine, the vehicle being capable of setting a proper running speed according to working conditions.

The above object is fulfilled, according to one aspect of the invention, by a work vehicle with a speed change device, comprising: a plurality of wheels including at least one driven wheel; an engine for driving said at least one driven wheel; a speed change device provided between said at least one driven wheel and said engine; and an automatic shifting means for operating said speed change device to a lower speed position within an automatic shifting range having a predetermined range and for operating said speed change device up to a speed position said speed change device was in before an operation to the lower speed position was effected, in response to load on said engine, wherein an entirety of said automatic shifting range is changeable to a low speed side and to a high speed side.

Thus, the automatic shifting device is capable of operating the speed change device to a lower speed position within an automatic shifting range having a predetermined range and is capable of operating the speed change device up to a speed position which the speed change device was in before an operation to the lower speed position was effected. Thus, the propelling speed change device is not automatically operated to the low speed side and high speed side beyond the automatic shifting range. And the entire automatic shifting range is changeable to the low speed side and high speed side. Thus, the automatic shifting range may be set appropriately according to working conditions.

The speed change performance of work vehicles can also be improved by providing a mechanism that can widen the automatic shifting range to include more speed positions and narrow the range to include less speed positions.

BRIEF DESCRIPTION OF THE DRAWINGS

FIG. 3 is a hydraulic circuit diagram showing forward and backward clutches, first and second main speed change devices, and so on;

DETAILED DESCRIPTION OF PREFERRED EMBODIMENTS

Next, some embodiments of this invention will be described with reference to the drawings. It should be understood that a combination of a characteristic feature described in a certain embodiment with a characteristic feature described in a different embodiment is, unless a conflict occurs, within the scope of this invention.

[1]

Figure 1:
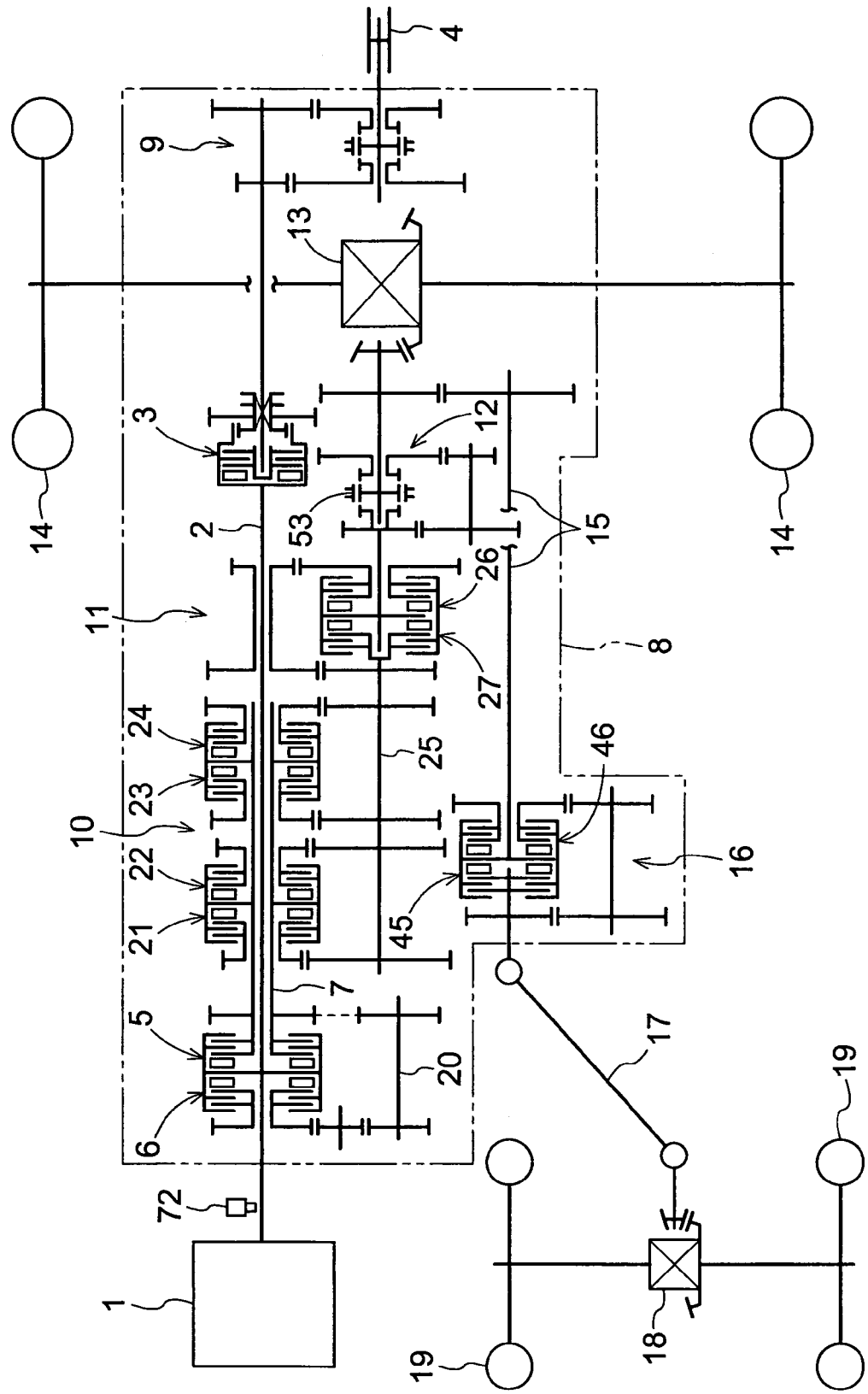
FIG. 1 is a schematic view showing a transmission system in a transmission case.

FIG. 1 shows a transmission case 8 of the four-wheel drive type agricultural tractor which is one example of work vehicles. Power of an engine 1 is transmitted to a pair of rear wheels 14 through a forward clutch 5 or a backward clutch 6, a tubular shaft 7, a first main speed change device 10 (corresponding to the propelling speed change device), a second main speed change device 11, an auxiliary speed change device 12 and a rear wheel differential 13. The power branched off immediately upstream of the rear wheel differential 13 is transmitted to a pair of front wheels 19 through a transmission shaft 15, a front wheel speed change device 16 of the hydraulic clutch type, a front wheel transmission shaft 17 and a front wheel differential 18. The power of the engine 1 is transmitted also to a PTO shaft 4 through a transmission shaft 2, a PTO clutch 3 and a PTO speed change device 9 of the hydraulic multi-plate type.

As shown in FIG. 1, each of the forward and backward clutches 5 and 6 is the hydraulic multi-plate type having a combination of friction plates (not shown) and a piston (not shown), and is engageable by supplying hydraulic fluid. When the forward clutch 5 is engaged, the power of the engine 1 is transmitted from the forward clutch 5 directly to the tubular shaft 7 to drive the vehicle body forward. When the backward clutch 6 is engaged, the power of the engine 1 is transmitted through the backward clutch 6 and a transmission shaft 20 to the tubular shaft 7 in reversed rotation, to drive the vehicle body backward.

As shown in FIG. 1, the first main speed change device 10 is the hydraulic clutch type having a first speed clutch 21, a second speed clutch 22, a third speed clutch 23 and a fourth speed clutch 24 arranged in parallel, to provide four speeds. By selectively engaging the first to fourth speed clutches 21-24, the power on the tubular shaft 7 is transmitted to a transmission shaft 25 in four speeds.

As shown in FIG. 1, the second main speed change device 11 is the hydraulic clutch type having a low-speed clutch 26 and a high-speed clutch 27 arranged in parallel. By selectively engaging the low-speed and high-speed clutches 26 and 27, the power on the transmission shaft 25 is transmitted in two speeds to the auxiliary speed change device 12. The auxiliary speed change device 12 is the synchromesh type with a slidable shift element 53 for providing two speeds, and is mechanically operable by a shift lever 28 shown in FIG. 2.

Figure 2:
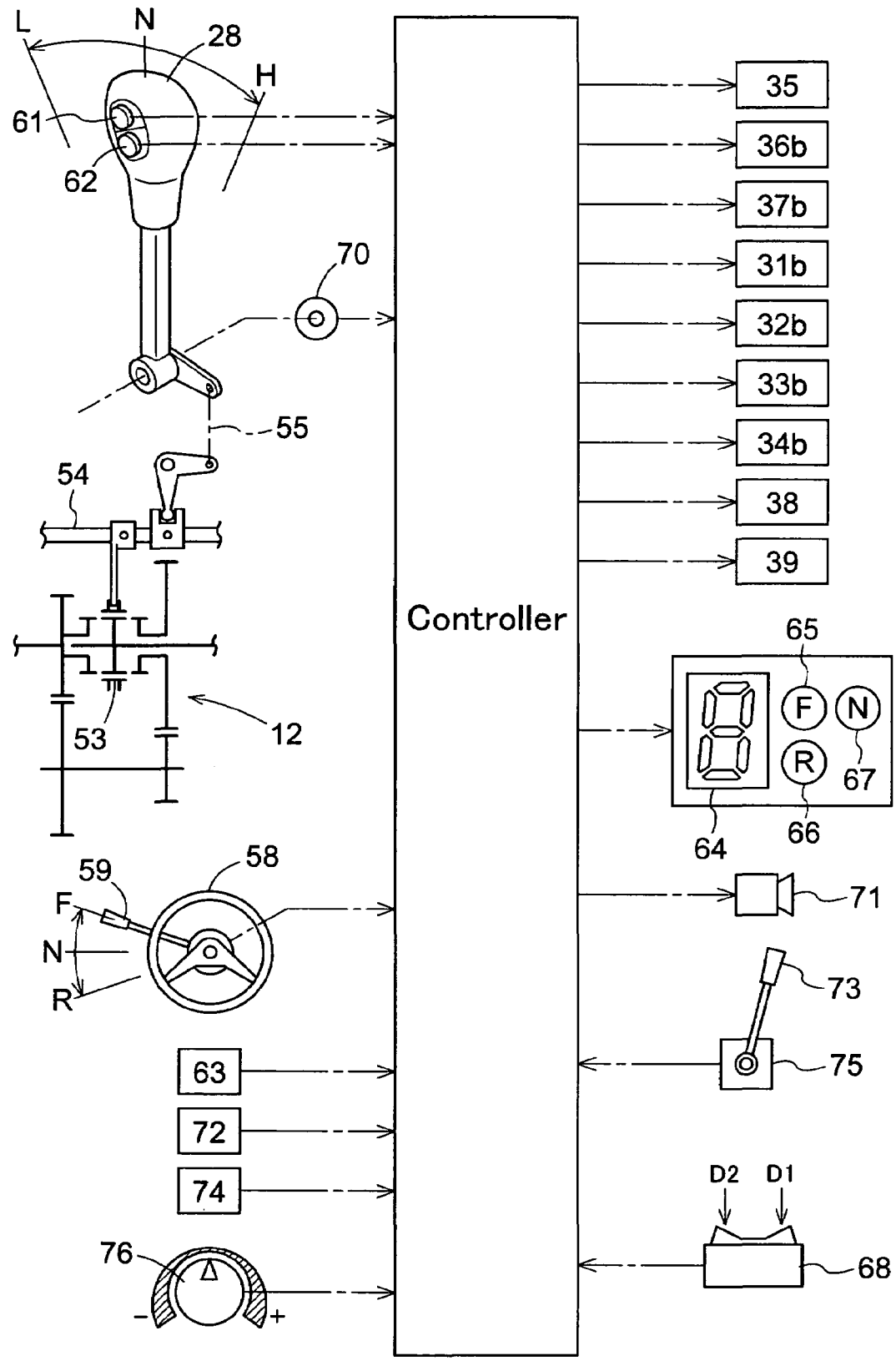
FIG. 2 is a view showing a linkage among a shift lever, an up-shift button and a down-shift button, a setting switch and various other components.

A control unit shown in FIG. 2 has a CPU and memory, receives signals from switches and sensors to be described in this specification, generates control signals for controlling actuators of valves, and transmits the control signals to required components. Thus, even if not expressly described in the specification, each switch, each sensor, and each actuator and the control unit are in signal communication. The memory of the control unit stores one or more programs for executing a control algorism described in this specification.

[2]
A hydraulic circuit for the forward and backward clutches 5 and 6 and first and second main speed change devices 10 and 11 will be described next.

Figure 3:
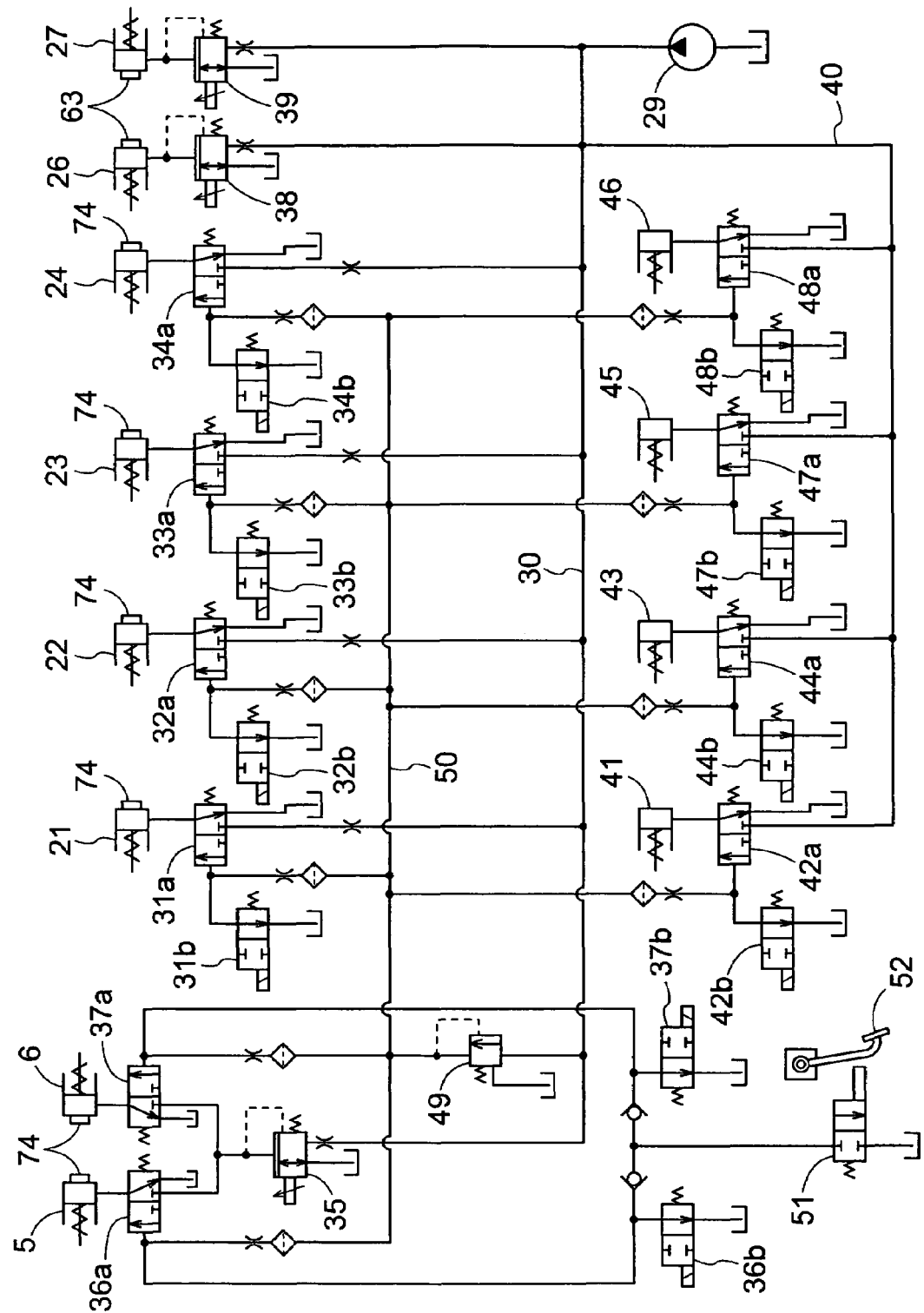

As shown in FIG. 3, an oil line 30 extending from a pump 29 has, connected thereto, an electromagnetic proportional valve 35 and selector valves 36a and 37a of the pilot operated type for the forward and backward clutches 5 and 6, selector valves 31a, 32a, 33a and 34a of the pilot operated type for the first to fourth speed clutches 21-24, and electromagnetic proportional valves 38 and 39 for the low-speed and high-speed clutches 26 and 27.

As shown in FIG. 3, an oil line 40 branched from the oil line 30 has, connected thereto, a selector valve 42a of the pilot operated type for a hydraulic clutch 41 for differential locking of the front wheel differential 18, a selector valve 44a of the pilot operated type for a hydraulic clutch 43 for differential locking of the rear wheel differential 13, and selector valves 47a and 48a of the pilot operated type for a standard clutch 45 and an accelerating clutch 46 of the front wheel speed change device 16. The selector valves 31a-34a, 36a, 37a, 42a, 44a, 47a and 48a are biased by springs to drain positions (disengaging positions), and are operated to supply positions (engaging positions) by pilot pressure supplied.

As shown in FIG. 3, a pilot oil line 50 branches through a reducing valve 49 from the oil line 30. The pilot oil line 50 is connected to controls of the selector valves 31a-34a, 36a, 37a, 42a, 44a, 47a and 48a. Solenoid operated valves 31b, 32b, 33b, 34b, 36b, 37b, 42b, 44b, 47b and 48b are connected to the controls. The solenoid operated valves 31b-34b, 36b, 37b, 42b, 44b, 47b and 48b are biased by springs to drain positions (disengaging positions). When the solenoid operated valves 31b-34b, 36b, 37b, 42b, 44b, 47b and 48b are operated to supply positions, pilot pressure is supplied to the controls of the selector valves 31a-34a, 36a, 37a, 42a, 44a, 47a and 48a, to operate the selector valves 31a-34a, 36a, 37a, 42a, 44a, 47a and 48a to supply positions (engaging positions).

[3]
A construction for operating the forward and backward clutches 5 and 6 and first and second main speed change devices 10 and 11 will be described next.

As shown in FIG. 3, a switch valve 51 is provided for draining pilot pressure oil from the controls of the selector valves 36a and 37a. The switch valve 51 is biased to a closed position by a spring, and a clutch pedal 52 is provided for operating the switch valve 51 to an open position. As shown in FIG. 2, a forward and backward switching lever 59 extends from a base of a steering wheel 58 for steering the front wheels 19. The switching lever 59 is operable to a forward position F, a backward position R and a neutral position N.

As shown in FIG. 2, the shift lever 28 is supported to be rockable about a transverse axis on a driving platform of the vehicle body. The shift lever 28 is mechanically linked by a link mechanism 55 to a shift rod 54 for sliding the shift element 53 of the auxiliary speed change device 12. The shift lever 28 is operable to a neutral position N, a low-speed position L and a high-speed position H, to operate the auxiliary speed change device 12 (shift element 53) to a neutral position, a low-speed position and a high-speed position. A position sensor 70 is provided for detecting the operated positions of the shift lever 28. An up-shift button 61 (corresponding to a manual shifter) and a down-shift button 62 (corresponding to a manual shifter) are arranged vertically on the left side of the shift lever 28. When the up-shift button 61 and down-shift button 62 are pushed, the first and second main speed change devices 10 and 11 are operated as described in section [6] hereinafter.

As shown in FIG. 2, the driving platform includes a seven-segment speed indicator 64 for indicating shift positions (first to eighth speeds) of the first and second main speed change devices 10 and 11, a forward lamp 65 and a backward lamp 66 for indicating which of the forward and backward clutches 5 and 6 is engaged, and a neutral lamp 67 for indicating that the shift lever 28 or forward and backward switching lever 59 is in the neutral position N. As shown in FIG. 3, pressure sensors 74 are provided for detecting a working pressure of the forward and the backward clutches 5 and 6, and the forward lamp 65 and backward lamp 66 are lit based on detection by the pressure sensor 74.

As shown in FIG. 2, a setting switch 68 (corresponding to a manual selector) is provided to be manually operable. The setting switch 68 is operable to three positions including a manual mode position shown in FIG. 2, a run mode position when pushed in a D1 direction, and a load mode position when pushed in a D2 direction. When the setting switch 68 is pushed to the manual mode position, run mode position and load mode position, a manual mode, a run mode (corresponding to the automatic mode) and a load mode (corresponding to the automatic mode) are set as described in sections [6], [7], [8] and [9] hereinafter.

Figure 4:
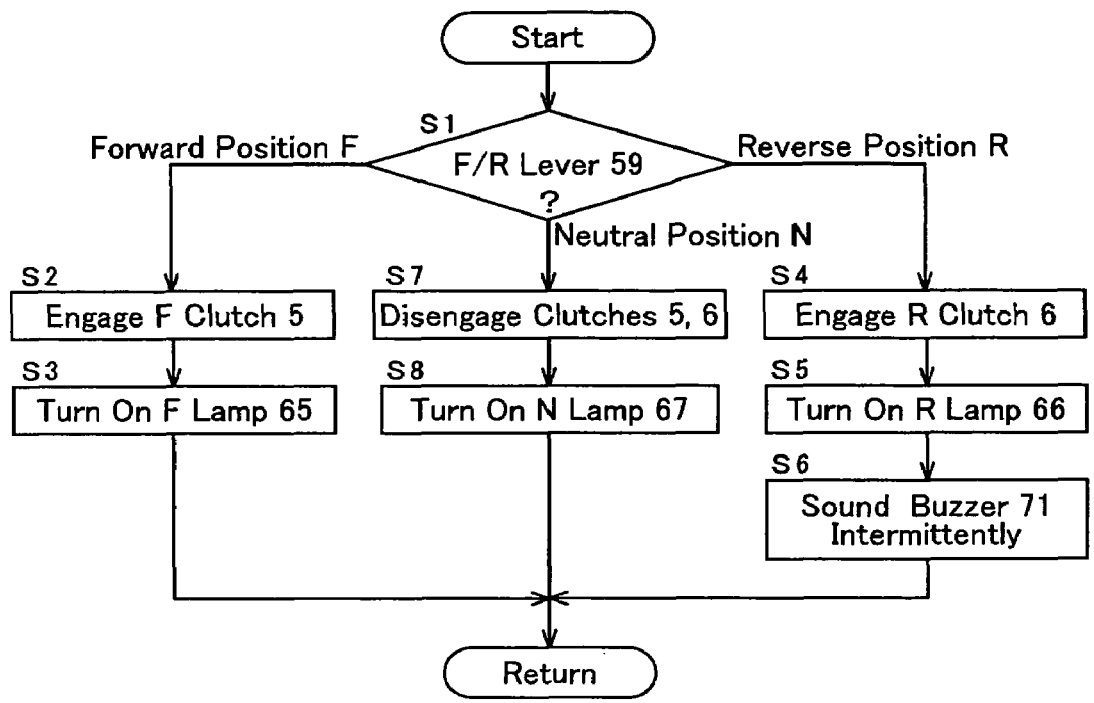
FIG. 4 is a view showing a flow of control in time of operating a forward and backward drive switching lever.

[4]
Next, operation of the forward and backward switching lever 59 will be described with reference to FIG. 4.

When the forward and backward switching lever 59 is operated to the forward position F (step S1), a control current is supplied to the solenoid controlled valve 36b to operate the selector valve 36a to the supply position, which engages the forward clutch 5 (step S2) and lights the forward lamp 65 (step S3). When the forward and backward switching lever 59 is operated to the backward position R (step S1), the control current is supplied to the solenoid controlled valve 37b to operate the selector valve 37a to the supply position, which engages the backward clutch 6 (step S4), lights the backward lamp 66 (step S5), and intermittently sounds a buzzer 71 shown in FIG. 2 (step S6).

When the forward and backward switching lever 59 is operated to the neutral position N (step S1), the control current to the solenoid controlled valves 36b and 37b is stopped to operate the selector valves 36a and 37a to the drain positions, which disengages the forward and backward clutches 5 and 6 (step S7) and lights the neutral lamp 67 (step S8). When the clutch pedal 52 is depressed, the switch valve 51 is operated to the open position to operate the selector valves 36a and 37a to the drain positions, which disengages the forward and backward clutches 5 and 6, and lights the neutral lamp 67. When both of the forward and backward clutches 5 and 6 are disengaged as above, power transmission through the forward and backward clutches 5 and 6 is broken to stop the vehicle body.

[5]

Next, operation of the auxiliary speed change device 12 by the shift lever 28 will be described.

When the shift lever 28 is operated to the neutral position N, the auxiliary speed change device 12 (shift element 53) is operated to the neutral position. When the shift lever 28 is operated to the low-speed position L, the auxiliary speed change device 12 (shift element 53) is operated to the low-speed position. When the shift lever 28 is operated to the high-speed position H, the auxiliary speed change device 12 (shift element 53) is operated to the high-speed position.

When, for example, the shift lever 28 is operated to the neutral position N, with the forward and backward switching lever 59 operated to the forward position F (i.e. with the forward clutch 5 engaged, and the backward clutch 6 disengaged), the selector valve 36a is operated to the drain position by the solenoid controlled valve 36b, based on the detection by the position sensor 70, to disengage the forward clutch 5.

Subsequently, when the shift lever 28 is operated to the low-speed position L (or high-speed position H), the selector valve 36a is operated to the supply position by the solenoid controlled valve 36b, based on the detection of the position sensor 70, and the forward clutch 5 is gradually engaged by the electromagnetic proportional valve 35.

When the shift lever 28 is operated to the neutral position N and to the low-speed position L (or high-speed position H) as described above, with the forward and backward switching lever 59 operated to the backward position R (i.e. with the backward clutch 6 engaged, and the forward clutch 5 disengaged), the backward clutch 6 is disengaged and then engaged, as is the forward clutch 5.

[6]

Next, a state where the setting switch 68 is pushed to the manual mode position will be described with reference to FIG. 5 (this corresponding to the manual speed change device).

When the setting switch 68 is pushed to the manual mode position, the manual mode is set. As shown in FIG. 1, the first main speed change device 10 can provide four speeds, and the second main speed change device 11 can provide two speeds. Thus, the first and second main speed change devices 10 and 11 together can provide eight speeds. When the low-speed clutch 26 is engaged, the first to fourth speed clutches 21-24 correspond to shift positions for the first to fourth speeds. When the high-speed clutch 27 is engaged, the first to fourth speed clutches 21-24 correspond to shift positions for the fifth to eighth speeds.

As shown in FIGS. 2 and 3, the first to fourth speed clutches 21-24 and the low-speed and high-speed clutches 26 and 27 have pressure sensors 63 and 74 for detecting working pressure, respectively. The pressure sensors 63 and 74 detect a current shift position of the first and second main speed change devices 10 and 11 (i.e. one of the first to eighth speeds). The shift position detected of the first and second main speed change devices 10 and 11 is displayed on the speed indicator 64.

Assume that, in the above state, the up-shift button 61 or down-shift button 62 is pushed (steps S11 and S12). When the up-shift button 61 is pushed (step S11), as shown in a solid line A1 (point of time B1) in FIG. 6, one of the first to fourth speed clutches 21-24 next higher than the current shift position of the first and second main speed change devices 10 and 11 begins to be engaged by a corresponding one of the solenoid controlled valves 31b-34b (step S13). When the down-shift button 62 is pushed (step S12), one of the first to fourth speed clutches 21-24 next lower than the current shift position of the first and second main speed change devices 10 and 11 begins to be engaged by a corresponding one of the solenoid controlled valves 31b-34b (step S14).

Figure 6:
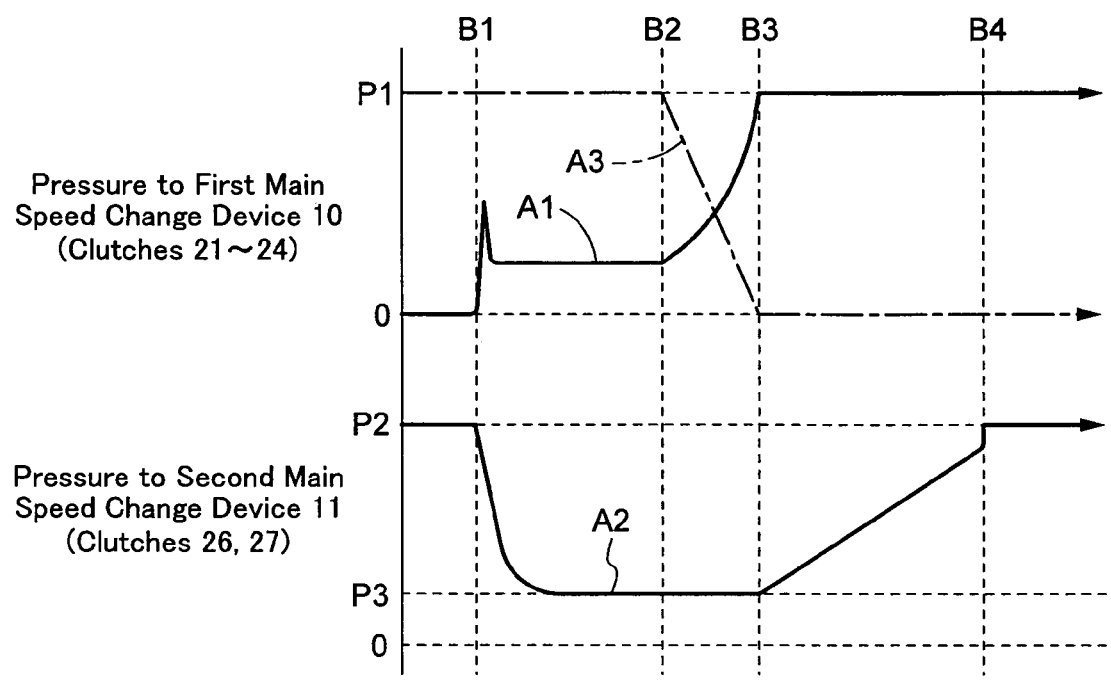
FIG. 6 is a view showing states of a first to a fourth speed clutches and a low speed and a high speed clutches in time of pushing the up-shift button and down-shift button in the manual mode.

When the shift lever 28 is in the low-speed position L or high-speed position H (step S15), substantially simultaneously with steps S13 and S14, as shown in a solid line A2 (point of time B1) in FIG. 6, the working pressure of the low-speed or high-speed clutch 26 or 27 engaged is lowered from the working pressure P2 for engagement to a predetermined low pressure P3 by the electromagnetic proportional valve 38 or 39 (step S16). When a change is made in this case from the shift position for the fourth speed to the shift position for the fifth speed, the working pressure of the low-speed clutch 26 is reduced to zero, and the working pressure of the high-speed clutch 27 is raised from zero to the predetermined low pressure P3. Conversely, when a change is made from the shift position for the fifth speed to the shift position for the fourth speed, the working pressure of the high-speed clutch 27 is reduced to zero, and the working pressure of the low-speed clutch 26 is raised from zero to the predetermined low pressure P3.

As shown in the solid line A1 (from point of time B2 to point of time B3) in FIG. 6, the working pressure of the next higher or lower one of the first to fourth speed clutches 21-24 begins to be raised by one of the solenoid controlled valves 31b-34b to the working pressure P1 for engagement. Simultaneously, as shown in a long dashed short dashed line A3 (from point of time B2 to point of time B3) in FIG. 6, the working pressure of one of the first to fourth speed clutches 21-24 operative before the up-shift button 61 or down-shift button 62 was pressed begins to be lowered by one of the solenoid controlled valves 31b-34b from the working pressure P1 for engagement to zero (step S17).

When the shift lever 28 is in the low-speed position L or high-speed position H (step S18), as shown in the solid line A2 (from point of time B3 to point of time B4) in FIG. 6, the working pressure of the low-speed or high-speed clutch 26 or 27 is gradually raised from the predetermined low pressure P3 by the electromagnetic proportional valve 38 or 39 (step S19). As a result, power begins to be transmitted from the next higher or lower one of the first to fourth speed clutches 21-24 through the low-speed or high-speed clutch 26 or 27. When the pressure sensor 63 detects the working pressure of the low-speed or high-speed clutch 26 or 27 having reached the working pressure P2 for engagement as at point of time B4 of the solid line A2 in FIG. 6 (step S20), it is determined that the shifting operation based on the pushing of the up-shift button 61 or down-shift button 62 is completed. A speed position of the first and second main speed change devices 10 and 11 resulting from the shifting operation is displayed on the speed indicator 64 (step S21). The buzzer 71 is sounded once to inform the operator of the end of the shifting operation (step S22). Then, the operation moves to step S11 to be ready for a next shifting operation based on pushing of the up-shift button 61 or down-shift button 62.

When the shift lever 28 is in the neutral position N (steps S15 and S18), the auxiliary speed change device 12 (shift element 53) is operated to the neutral position, and the vehicle stands still. When the up-shift button 61 or down-shift button 62 is pushed, with the shift lever 28 placed in the neutral position N (steps S11 and S12), the first and second main speed change devices 10 and 11 (first to fourth speed clutches 21-24, and the low-speed and high-speed clutches 26 and 27) are operated for a one-step higher or lower speed as described above (steps S13, S14 and S17). A speed position of the first and second main speed change devices 10 and 11 resulting from the shifting operation is displayed on the speed indicator 64 (step S21), and the buzzer 71 is sounded once (step S22).

In this case, since the vehicle is standing still, the operation for changing the working pressure of the low-speed or high-speed clutch 26 or 27 to the predetermined low pressure P3 as in steps S16 and S19 is not carried out, nor the operation for changing to the working pressure P2 for engagement (steps S15 and S18).

[7]

Figure 7:
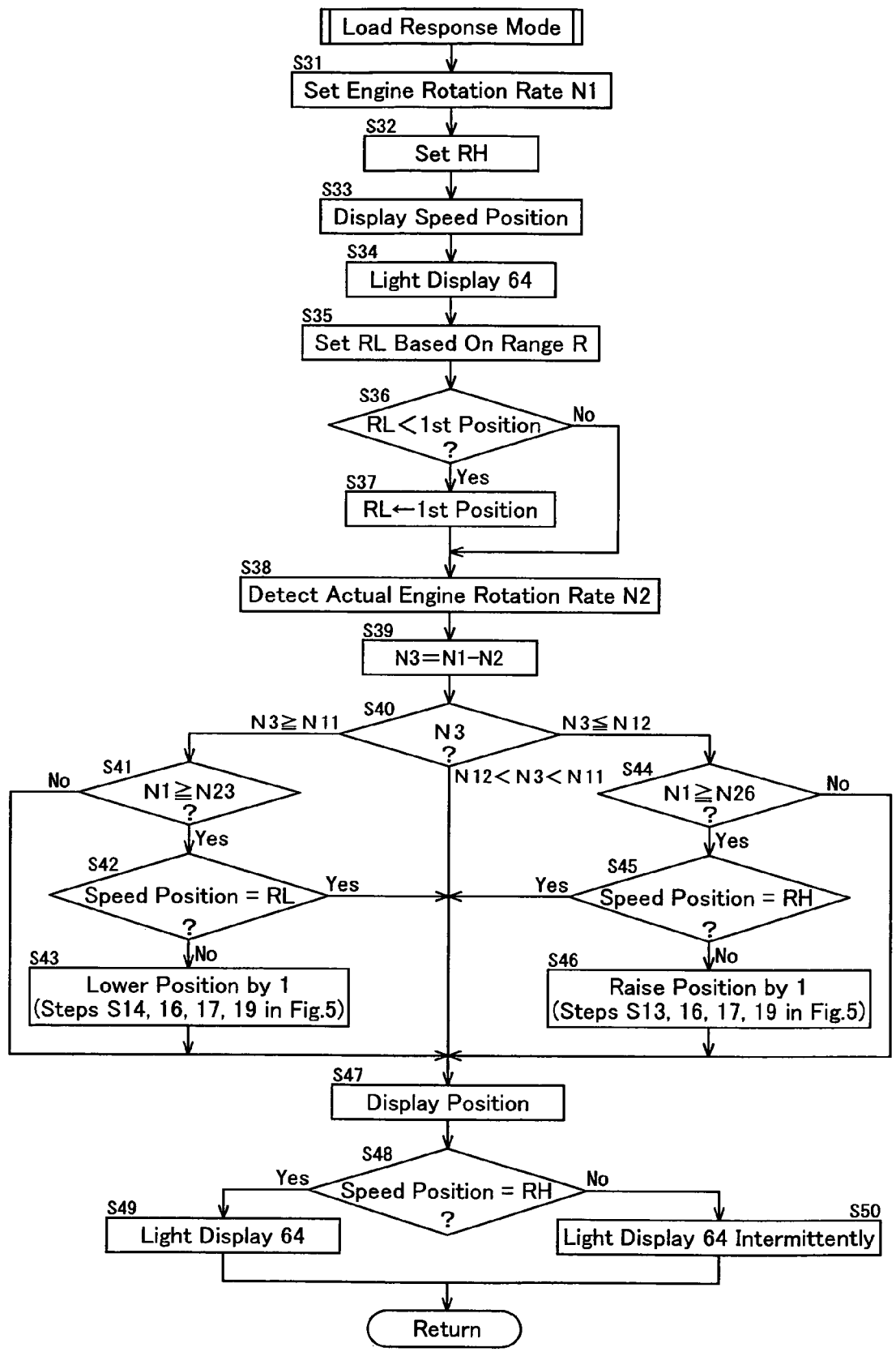
FIG. 7 is a view showing a flow of control for operating the first and second main speed change devices automatically to a low speed side and a high speed side in a load mode.

Next, a state where the setting switch 68 is pushed to the load mode position will be described with reference to FIG. 7.

When the setting switch 68 is pushed to the load mode position, the load mode is set. In the load mode in which the vehicle engages in a cultivating operation with a plow (not shown), a subsoiler (not shown) or the like, the first and second main speed change devices 10 and 11 are automatically operated to a low speed side and a high speed side in an automatic shifting range R of the load mode as described hereinafter according to ups and downs of an operating ground, variations in soil texture and so on.

As shown in FIGS. 1 and 2, a hand accelerator lever 73 is provided to be manually operable to set an accelerator opening for the engine 1, and an opening sensor 75 of the potentiometer type is provided for detecting an operative position of the hand accelerator lever 73. Further, a rotational frequency sensor 72 is provided for detecting an actual number of rotations N2 of the engine 1. A relationship is determined in advance between the number of rotations of the engine 1 in unloaded condition (i.e. a state in which the engine 1 is free from a load, with the forward and backward clutches 5 and 6 are disengaged, and the PTO clutch 3 is disengaged) and detection value of the opening sensor 75 (i.e. operative position of the hand accelerator lever 73). From the detection value of the opening sensor 75 (operative position of the hand accelerator lever 73), the number of rotations of the engine 1 in the unloaded condition is determined as a set number of rotations N1 of the engine 1 (step S31).

As described in section [12] hereinafter, the automatic shifting range R of the load mode is set to two stages, three stages or four stages. A shift position of the first and second main speed change devices 10 and 11 in time of the setting switch 68 being pushed to the load mode position is set as a high speed limit position RH in the automatic shifting range R of the load mode (step S32). The shift position of the first and second main speed change devices 10 and 11 (the high speed limit position RH in the automatic shifting range R of the load mode) is displayed on the speed indicator 64 (step S33), and the speed indicator 64 is lit (step S34).

After step S32, a low speed limit position RL in the automatic shifting range R of the load mode is set based on the width of the automatic shifting range R of the load mode described in section [12] hereinafter (step S35). When, for example, the fourth speed position is set as the high speed limit position RH of the automatic shifting range R of the load mode, and the width of the automatic shifting range R of the load mode is three stages, the second speed position is set as the low speed limit position RL of the automatic shifting range R of the load mode. In this case, where the low speed limit position RL of the automatic shifting range R of the load mode becomes lower than the first speed position (step S36), the first speed position is set as the low speed limit position RL of the automatic shifting range R of the load mode (step S37).

The actual number of rotations N2 of the engine 1 is detected (step S38), and a difference N3 between the set number of rotations N1 of the engine 1 and the actual number of rotations N2 of the engine 1 is determined (step S39). When the difference N3 between the set number of rotations N1 of the engine 1 and the actual number of rotations N2 of the engine 1 is large, it can be determined that a large load is acting on the engine 1 and has greatly reduced the actual number of rotations N2 of the engine 1. When the difference N3 between the set number of rotations N1 of the engine 1 and the actual number of rotations N2 of the engine 1 is small, it can be determined that a small load is acting on the engine 1 and has little reduced the actual number of rotations N2 of the engine 1.

Figure 13:
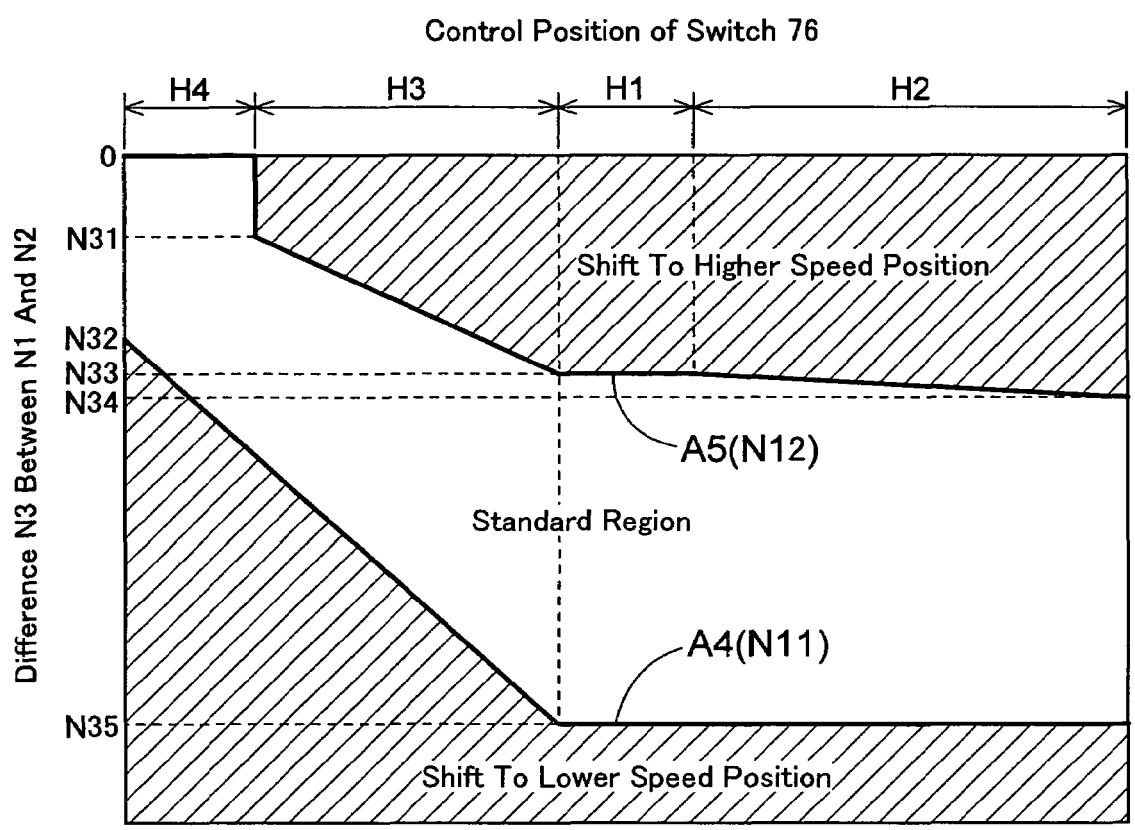
FIG. 13 is a view showing a relationship between position of a sensitivity adjusting switch, and first and second set values.

As shown in FIG. 13, a first preset value N11 and a second preset value N12 are set for the difference N3 between the set number of rotations N1 of the engine 1 and the actual number of rotations N2 of the engine 1. When the difference N3 between the set number of rotations N1 of the engine 1 and the actual number of rotations N2 of the engine 1 is greater than the first preset value N11 (step S40), it can be determined that the actual number of rotations N2 of the engine 1 has reduced greatly. Then, steps S14, S16, S17 and S19 in FIG. 5 are executed to operate the first and second main speed change devices 10 and 11 for a next lower speed (step S43).

In this case, when the set number of rotations N1 of the engine 1 is less than the preset value N23 (e.g. 1,300 rpm) (step S41), or a shift position of the first and second main speed change devices 10 and 11 prior to the above operation is the low speed limit position RL in the automatic shifting range R of the load mode (step S42), the first and second main speed change devices 10 and 11 are not operated for the next lower speed, but are retained in the shift position prior to the above operation.

When the difference N3 between the set number of rotations N1 of the engine 1 and the actual number of rotations N2 of the engine 1 becomes less than the second preset value N12 (step S40), it can be determined that the actual number of rotations N2 of the actual engine 1 has little reduced. Then, steps S13, S16, S17 and S19 in FIG. 5 are executed to operate the first and second main speed change devices 10 and 11 for a next higher speed (step S46).

In this case, when the set number of rotations N1 of the engine 1 is less than the preset value N26 (e.g. 1,600 rpm) (step S44), or a shift position of the first and second main speed change devices 10 and 11 prior to the above operation is the high speed limit position RH in the automatic shifting range R of the load mode (step S45), the first and second main speed change devices 10 and 11 are not operated for the next higher speed, but are retained in the shift position prior to the above operation.

After steps S40-S46, the shift position of the first and second main speed change devices 10 and 11 is displayed on the speed indicator 64 (step S47). In this case, when the shift position of the first and second main speed change devices 10 and 11 is the high-speed limit position RH in the automatic shifting range R of the load mode, the speed indicator 64 is lit (steps S48 and S49). When the shift position of the first and second main speed change devices 10 and 11 is not the high-speed limit position RH in the automatic shifting range R of the load mode, the speed indicator 64 is blinked (steps S48 and S50).

In the load mode, as described above, based on the set number of rotations N1 of the engine 1, the difference N3 between the set number of rotations N1 of the engine 1 and the actual number of rotations N2 of the engine 1, and the first and second preset values N11 and N12, the first and second main speed change devices 10 and 11 are automatically operated to the low speed side or high speed side in the automatic shifting range R of the load mode (the above corresponding to the automatic shifting device).

In this case, when the shift lever 28 is operated from the low-speed position L to the high-speed position H or from the high-speed position H to the low-speed position L, or when the setting switch 68 is pushed to the load mode position once again, with the first and second main speed change devices 10 and 11 automatically operated to the low speed side or high speed side in the automatic shifting range R of the load mode, the shift position of the first and second main speed change devices 10 and 11 is set again as the high-speed limit position RH in the automatic shifting range R of the load mode, and the operation moves to step S33.

[8]

Next, the first half of a state where the setting switch 68 is pushed to the run mode position will be described with reference to FIG. 8.

When the setting switch 68 is pushed to the run mode position, the run mode is set. In the run mode in which the vehicle engages in a running operation towing a trailer (not shown) or the like, the first and second main speed change devices 10 and 11 are automatically operated to a low speed side and a high speed side in an automatic shifting range R of the run mode as described hereinafter according to operation of the hand accelerator lever 73 or variations in the actual number of rotations N2 of the engine 1 in an uphill run.

As in the load mode described in section [7] above, from the detection value of the opening sensor 75 (operative position of the hand accelerator lever 73), the number of rotations of the engine 1 in the unloaded condition is determined as a set number of rotations N1 of the engine 1 (step S51). As described in section [12] hereinafter, the automatic shifting range R of the run mode is set to two stages, three stages or four stages. A shift position of the first and second main speed change devices 10 and 11 in time of the setting switch 68 being pushed to the run mode position is set as a high speed limit position RH in the automatic shifting range R of the run mode (step S52). The shift position of the first and second main speed change devices 10 and 11 (the high speed limit position RH in the automatic shifting range R of the run mode) is displayed on the speed indicator 64 (step S53), and the speed indicator 64 is lit (step S54).

After the high speed limit position RH in the automatic shifting range R of the run mode is set, a low speed limit position RL in the automatic shifting range R of the run mode is set based on the width of the automatic shifting range R of the run mode described in section [12] hereinafter (step S55). When, for example, the fourth speed position is set as the high speed limit position RH of the automatic shifting range R of the run mode, and the width of the automatic shifting range R of the run mode is three stages, the second speed position is set as the low speed limit position RL of the automatic shifting range R of the run mode. In this case, where the low speed limit position RL of the automatic shifting range R of the run mode becomes lower than the first speed position (step S56), the first speed position is set as the low speed limit position RL of the automatic shifting range R of the run mode (step S57).

The actual number of rotations N2 of the engine 1 is detected (step S58), and a difference N3 between the set number of rotations N1 of the engine 1 and the actual number of rotations N2 of the engine 1 is determined (step S59). When the difference N3 between the set number of rotations N1 of the engine 1 and the actual number of rotations N2 of the engine 1 is large, it can be determined that a large load is acting on the engine 1 and has greatly reduced the actual number of rotations N2 of the engine 1.

As shown in FIG. 13, the first preset value N11 is set for the difference N3 between the set number of rotations N1 of the engine 1 and the actual number of rotations N2 of the engine 1. When the difference N3 between the set number of rotations N1 of the engine 1 and the actual number of rotations N2 of the engine 1 is greater than the first preset value N11 (step S60), it can be determined that the actual number of rotations N2 of the engine 1 has reduced greatly. Then, steps S14, S16, S17 and S19 in FIG. 5 are executed to operate the first and second main speed change devices 10 and 11 for a next lower speed (step S63).

In this case, when the set number of rotations N1 of the engine 1 is less than the preset value N23 (e.g. 1,300 rpm) (step S61), or a shift position of the first and second main speed change devices 10 and 11 prior to the above operation is the low speed limit position RL in the automatic shifting range R of the run mode (step S62), the first and second main speed change devices 10 and 11 are not operated for the next lower speed, but are retained in the shift position prior to the above operation.

After steps S60-S63, the shift position of the first and second main speed change devices 10 and 11 is displayed on the speed indicator 64 (step S64). In this case, when the shift position of the first and second main speed change devices 10 and 11 is the high-speed limit position RH in the automatic shifting range R of the run mode, the speed indicator 64 is lit (steps S65 and S66). When the shift position of the first and second main speed change devices 10 and 11 is not the high-speed limit position RH in the automatic shifting range R of the run mode, the speed indicator 64 is blinked (steps S65 and S67).

[9]

Next, the second half of the state where the setting switch 68 is pushed to the run mode position will be described with reference to FIGS. 8 and 9.

When, in step S60 described in section [8] above, the difference N3 between the set number of rotations N1 of the engine 1 and the actual number of rotations N2 of the engine 1 is less than the first preset value N11, and the hand accelerator lever 73 is not operated (step S68), the first and second main speed change devices 10 and 11 are not operated.

Figure 5:
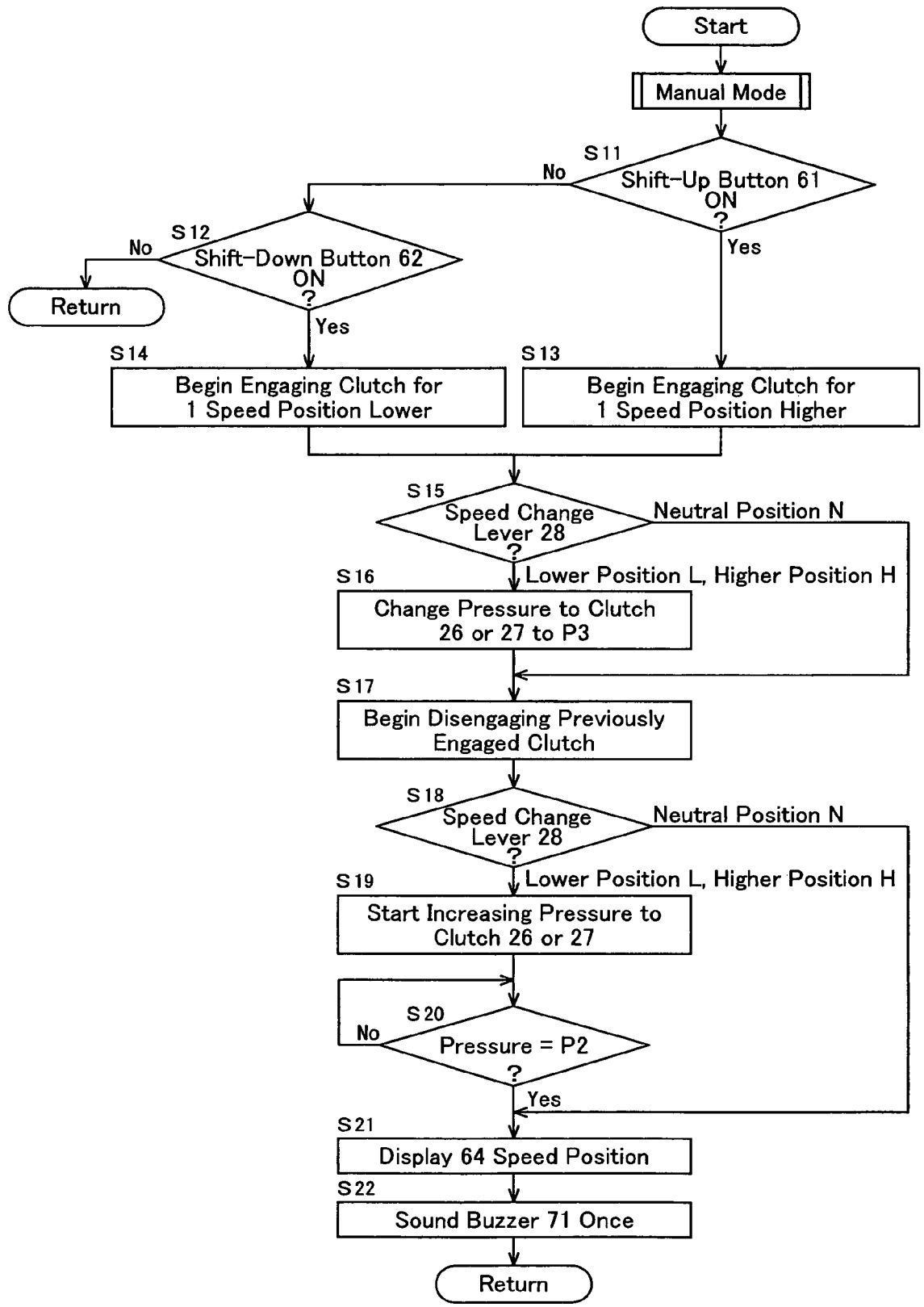
FIG. 5 is a view showing a flow of control in time of pushing the up-shift button and down-shift button in a manual mode.

When, in step S60 described in section [8] above, the hand accelerator lever 73 is operated to a high rotation side at low speed (step S68), the set number of rotations N1 of the engine 1 is less than a preset value N28 (e.g. 2,400 rpm) (step S69), the set number of rotations N1 of the engine 1 is equal to or greater than a preset value N22 (e.g. 1,200 rpm) and less than a preset value N24 (e.g. 1,400 rpm) (step S70), and the difference N3 between the set number of rotations N1 of the engine 1 and the actual number of rotations N2 of the engine 1 becomes less than a preset value N4 (e.g. 100 rpm) (step S73), steps S13, S16, S17 and S19 in FIG. 5 are executed to operate the first and second main speed change devices 10 and 11 for a next higher speed (step S75).

Next, when the set number of rotations N1 of the engine 1 is equal to or greater than the above preset value N24 (e.g. 1,400 rpm) and less than the preset value N26 (e.g. 1,600 rpm) (step S71), and the difference N3 between the set number of rotations N1 of the engine 1 and the actual number of rotations N2 of the engine 1 becomes less than the preset value N4 (e.g. 100 rpm) (step S73), steps S13, S16, S17 and S19 in FIG. 5 are executed to operate the first and second main speed change devices 10 and 11 for a further higher speed (step S75). Next, when the set number of rotations N1 of the engine 1 is equal to or greater than the preset value N26 (e.g. 1,600 rpm) and less than the preset value N28 (e.g. 2,400 rpm) (step S72), and the difference N3 between the set number of rotations N1 of the engine 1 and the actual number of rotations N2 of the engine 1 becomes less than the preset value N4 (e.g. 100 rpm) (step S73), steps S13, S16, S17 and S19 in FIG. 5 are executed to operate the first and second main speed change devices 10 and 11 for a still higher speed (step S75).

When, in step S60 described in section [8] above, the hand accelerator lever 73 is operated to the high rotation side at high speed (step S68), the set number of rotations N1 of the engine 1 is equal to or greater than the preset value N28 (e.g. 2,400 rpm) (step S76), and the actual number of rotations N2 of the engine 1 is equal to or greater than a preset value N21 (e.g. 1,100 rpm) and less than a preset value N23 (e.g. 1,300 rpm) (step S77), steps S13, S16, S17 and S19 in FIG. 5 are executed to operate the first and second main speed change devices 10 and 11 for a next higher speed (step S75). Next, when the actual number of rotations N2 of the engine 1 becomes equal to or greater than the preset value N23 (e.g. 1,300 rpm) and less than a preset value N25 (e.g. 1,500 rpm) (step S78), steps S13, S16, S17 and S19 in FIG. 5 are executed to operate the first and second main speed change devices 10 and 11 for a further higher speed (step S75).

Next, when the actual number of rotations N2 of the engine 1 becomes equal to or greater than the set number of rotations N1 (e.g. 1,500 rpm) of the engine 1 and less than a preset value N27 (e.g. 2,300 rpm) (step S79), steps S13, S16, S17 and S19 in FIG. 5 are executed to operate the first and second main speed change devices 10 and 11 for a still higher speed (step S75). Next, when the set actual number of rotations N2 of the engine 1 is equal to or greater than the preset value N27 (e.g. 2,300 rpm) (step S80), steps S13, S16, S17 and S19 in FIG. 5 are executed to operate the first and second main speed change devices 10 and 11 for a still higher speed (step S75).

In this case, when, in steps S68-S73 and S76-S80, the shift position of the first and second main speed change devices 10 and 11 prior to the operation is the high-speed limit position RH in the automatic shifting range R of the run mode (step S74), the first and second main speed change devices 10 and 11 are not operated for a next higher speed, but are retained in the shift position prior to the operation. After the above steps S68-S80, the operation moves to step S64 in FIG. 8.

In the run mode, as described in sections [8] and [9] above, based on the set number of rotations N1 of the engine 1, the actual number of rotations N2 of the engine 1, the difference N3 between the set number of rotations N1 of the engine 1 and the actual number of rotations N2 of the engine 1, the first preset value N11, and operation of the hand accelerator lever 73, the first and second main speed change devices 10 and 11 are automatically operated to the low speed side or high speed side in the automatic shifting range R of the run mode (the above corresponding to the automatic shifting device).

Figure 8:
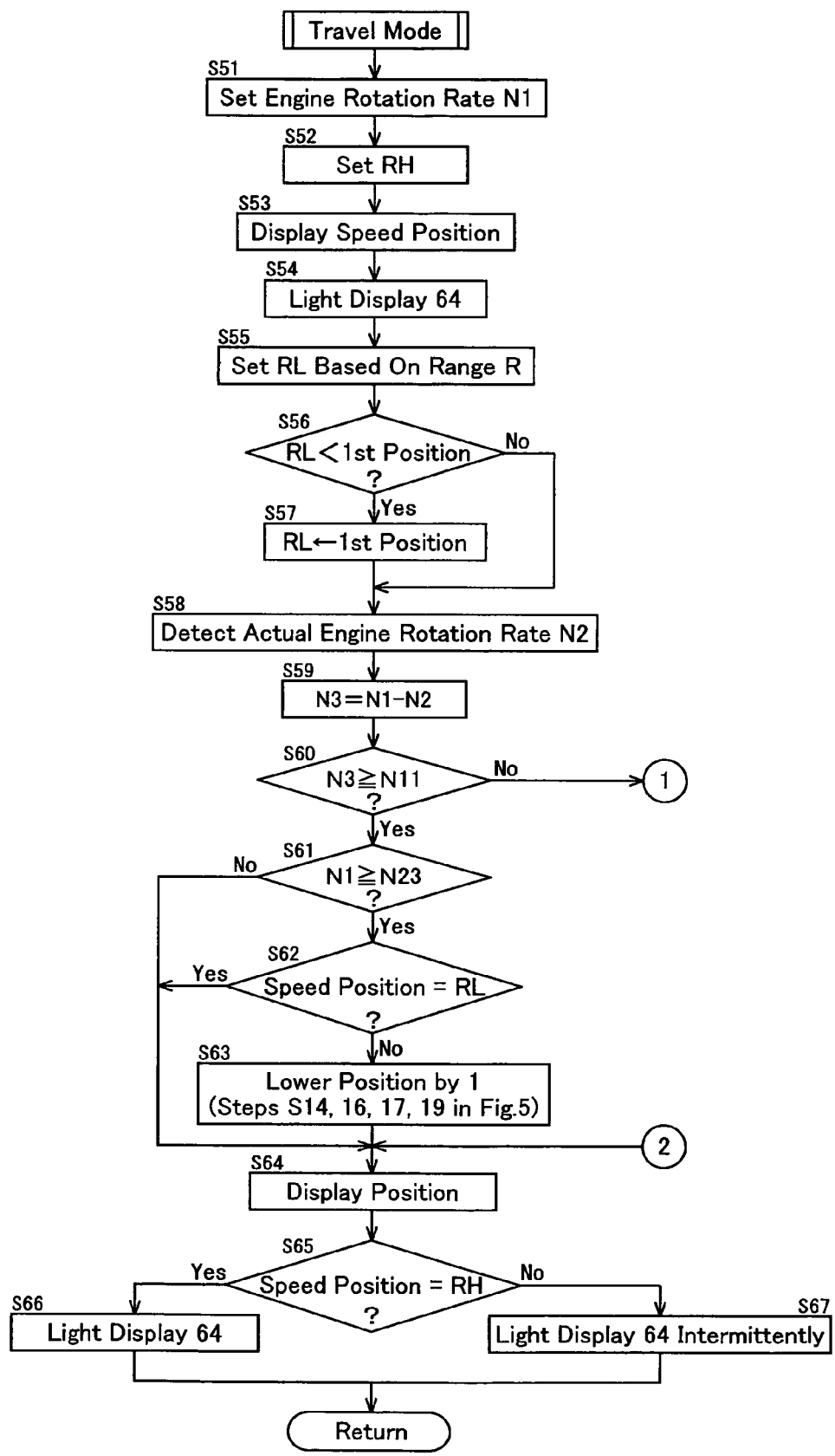
FIG. 8 is a view showing the first half of a flow of control for operating the first and second main speed change devices automatically to the low speed side and the high speed side in a run mode.
Figure 9:
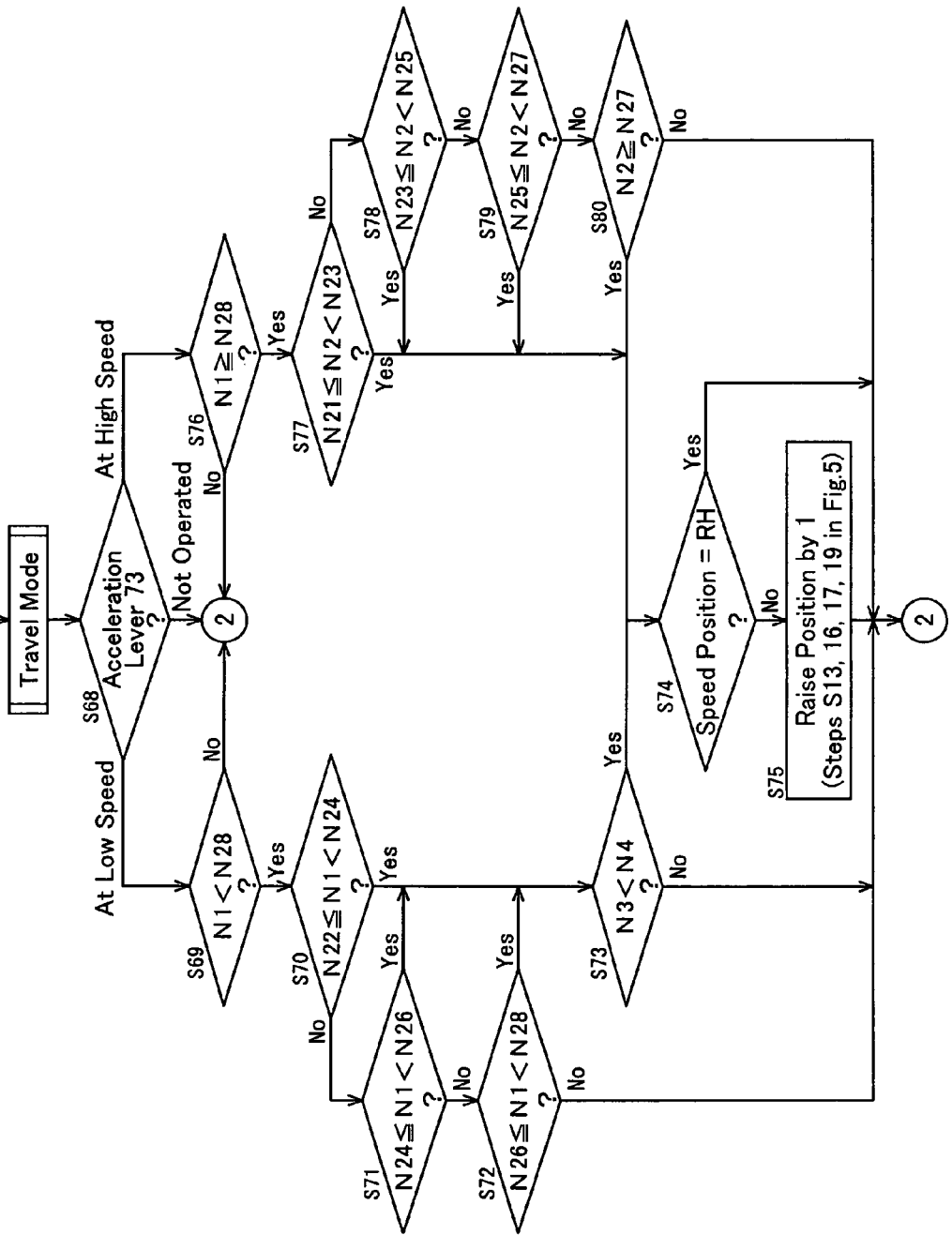
FIG. 9 is a view showing the second half of the flow of control for operating the first and second main speed change devices automatically to the low speed side and the high speed side in the run mode.

In this case, when the shift lever 28 is operated from the low-speed position L to the high-speed position H or from the high-speed position H to the low-speed position L, or when the setting switch 68 is pushed to the run mode position once again, with the first and second main speed change devices 10 and 11 automatically operated to the low speed side or high speed side in the automatic shifting range R of the run mode, the shift position of the first and second main speed change devices 10 and 11 is set again as the high-speed limit position RH in the automatic shifting range R of the run mode, and the operation moves to step S53 in FIG. 8.

[10]

Operation for setting the first and second preset values N11 and N12 (see sections [7], [8] and [9] above) by a sensitivity adjusting switch 76 will be described next.

A dial type sensitivity adjusting switch 76 is provided as shown in FIG. 2. The sensitivity adjusting switch 76 is operable to set the first preset value N11 (solid line A4) and second preset value N12 (solid line A5) as shown in FIG. 13. The first preset value N11 (solid line A4) and second preset value N12 (solid line A5) determine an "operating range for the high speed side", a "standard range" and an "operating range for the low speed side".

Thus, when, as described in sections [7], [8] and [9] above, the difference N3 between the set number of rotations N1 of the engine 1 and the actual number of rotations N2 of the engine 1 becomes equal to or greater than the first preset value N11 "operating range for the low speed side", the first and second main speed change devices 10 and 11 are operated for a next lower speed. When the difference N3 between the set number of rotations N1 of the engine 1 and the actual number of rotations N2 of the engine 1 is between the first and second preset values N11 and N12 ("standard region"), the first and second main speed change devices 10 and 11 are not operated for a lower speed and higher speed. When the difference N3 between the set number of rotations N1 of the engine 1 and the actual number of rotations N2 of the engine 1 becomes less than the second preset value N12 "operating range for the high speed side", the first and second main speed change devices 10 and 11 are operated for a next higher speed.

As shown in FIG. 13, when the sensitivity adjusting switch 76 is in an operation range H1, the first preset value N11 is maintained at "N35" ("N35" means a value shown by N35), and the second preset value N12 at "N33". When the sensitivity adjusting switch 76 is in an operation range H2, the first preset value N11 remains at "N35", but the second preset value N12 is changed linearly in a small range between "N33" and "N34" according to an operative position of the sensitivity adjusting switch 76. In this case, the values are in a relationship N33<N34<N35.

As shown in FIG. 13, when the sensitivity adjusting switch 76 is in an operation range H3, the second preset value N12 is changed linearly in a range between "N31" and "N33" according to an operative position of the sensitivity adjusting switch 76. In this case, the values are in a relationship N31<N33. The difference between "N31" and "N33" is larger than that between "N33" and "N34" (the rate of change of the second preset value N12 (solid line A5) is higher in the operation range H3 than in the operation range H2).

As shown in FIG. 13, when the sensitivity adjusting switch 76 is in an operation range H4, the second preset value N12 is set to "0". Thus, with the sensitivity adjusting switch 76 is in the operation range H4 and the second preset value N12 set to "0", the first and second main speed change devices 10 and 11 are not operated to the high speed side.

As shown in FIG. 13, when the sensitivity adjusting switch 76 is in the operation ranges H3 and H4, the first preset value N11 is changed linearly in a range between "N32" and "N35" according to an operative position of the sensitivity adjusting switch 76. In this case, the values are in a relationship 0<N31<N32<N33<N34<N35. The difference between "N32" and "N35" is larger than those between "N33" and "N34" and between "N31" and "N33" (the rate of change of the first preset value N11 (solid line A4) in the operation ranges H3 and H4 is higher than those of the second preset value N12 (solid line A5) in the operation range H2 and operation range H3).

[11]

A first automatic deceleration control and a second automatic deceleration control performed in the load mode and run mode described in sections [7], [8] and [9] hereinbefore will be described next.

The agricultural tractor has lift arms (not shown) at the rear of the vehicle body for raising and lowering a link mechanism (not shown). A working implement (e.g. a plough, subsoiler or rotary tiller) is connected to the link mechanism. The tractor makes a turn at an end of an operating field with the working implement raised from the ground.

When a manual control device (not shown) for operating the lift arms (e.g. a lift lever or lift switch) is operated to raise the lift arm or when the lift arms are in an upper limit position of a range of vertical movement, in the load mode (run mode) described in sections [7], [8] and [9] hereinbefore, the operation to the high speed side of the first and second speed change devices 10 and 11 is prohibited, and the first and second speed change devices 10 and 11 are operated to the low speed side by a first predetermined deceleration number of speeds (see section [12] hereinafter) in the automatic shifting range R of the load mode (run mode) (the above corresponding to the first automatic deceleration control).

In this case, where the first predetermined deceleration number of speeds requires the first and second speed change devices 10 and 11 to be operated to the low speed side beyond the low speed limit position RL in the automatic shifting range R of the load mode (run mode), the decelerating operation of the first and second speed change devices 10 and 11 will stop at the low speed limit position RL in the automatic shifting range R of the load mode (run mode).

Assume, for example, the hand accelerator lever 73 is operated to the low rotation side in time of vehicle turning or slowdown, the set number of rotations N1 of the engine 1 is less than a preset value (e.g. 1,000 rpm), and the actual number of rotations N2 of the engine 1 is less than a preset value (e.g. 2,300 rpm). In this case, the first and second speed change devices 10 and 11 are operated to the low speed side by a second predetermined deceleration number of speeds (see section [12] hereinafter) in the automatic shifting range R of the load mode (run mode) (the above corresponding to the second automatic deceleration control).

In this case, where the second predetermined deceleration number of speeds requires the first and second speed change devices 10 and 11 to be operated to the low speed side beyond the low speed limit position RL in the automatic shifting range R of the load mode (run mode), the decelerating operation of the first and second speed change devices 10 and 11 will stop at the low speed limit position RL in the automatic shifting range R of the load mode (run mode).

[12]

Figure 10:
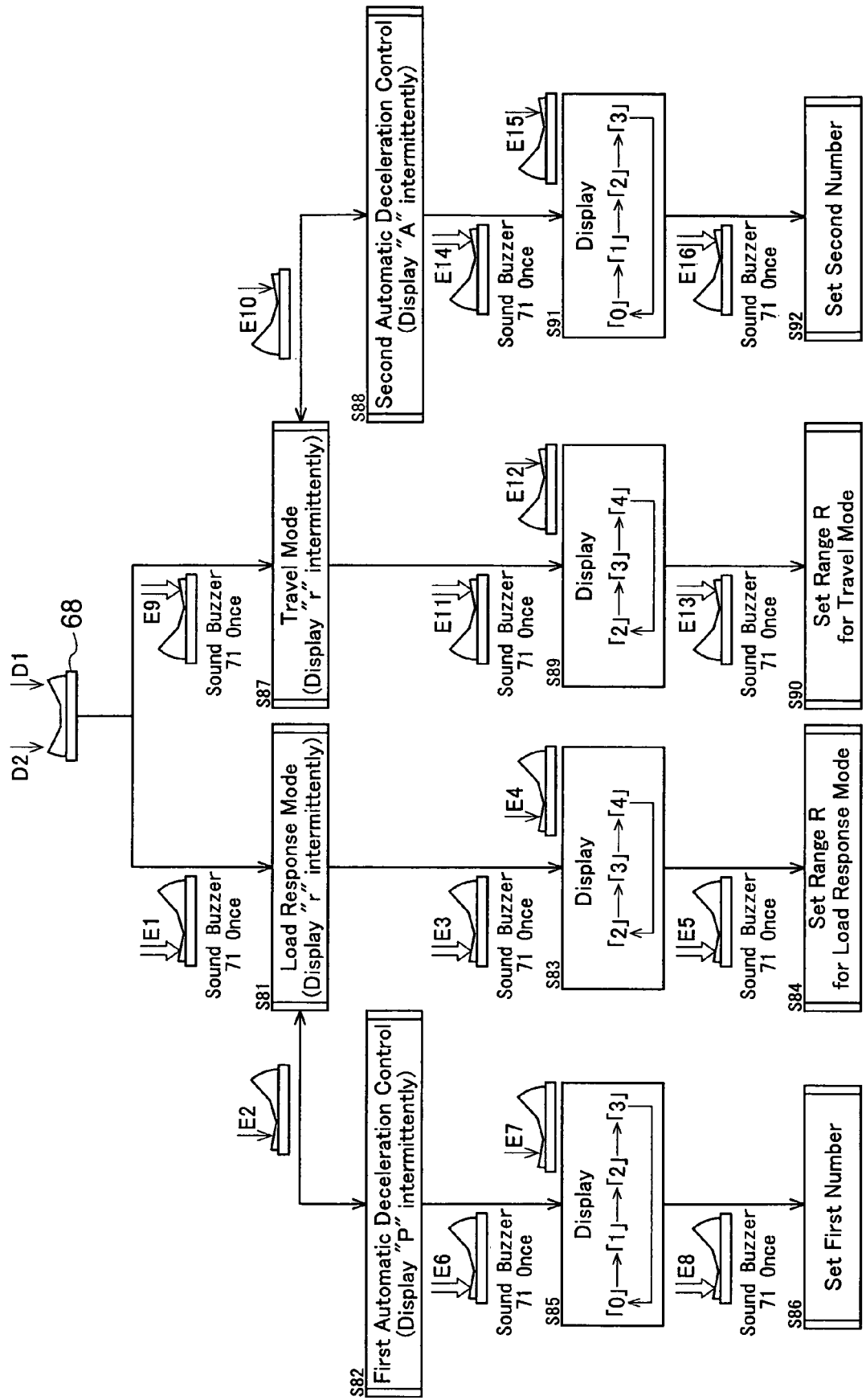
FIG. 10 is a view showing a flow of control for setting an automatic speed change range in the load mode (run mode)

A state of setting the width of the automatic shifting range R of the load mode (run mode) described in sections [7], [8] and [9] hereinbefore to two speeds, three speeds or four speeds, and a state of setting the first and second predetermined deceleration numbers of speeds for the first and second automatic deceleration controls described in section [11] above, will be described next with reference to FIG. 10.

When, with the shift lever 28 placed in the neutral position N, and after pushing the setting switch 68 to the load mode position (in D2 direction), a long pushing operation E1 (e.g. three seconds or longer) of the setting switch 68 is effected in D2 direction, the buzzer 71 sounds once, and the speed indicator 64 blinks while displaying "L" indicating a setting mode for the load mode (step S81). In this state, the setting mode for the load mode remains unestablished. A pushing operation E2 in D2 direction of the setting switch 64 causes the speed indicator 64 to blink while displaying "P" indicating a setting mode for the first automatic deceleration control (step S82) (the setting mode for the first automatic deceleration control also being unestablished).

In the state noted above where the setting mode for the load mode is unestablished (step S81) and the setting mode for the first automatic deceleration control also unestablished (step S82), each pushing operation E2 in D2 direction of the setting switch 64 causes an alternate display of the unestablished state of the setting mode for the load mode (step S81) and the unestablished state of the setting mode for the first automatic deceleration control (step S82).

When, in the state noted above where the setting mode for the load mode is unestablished (step S81), a long pushing operation E3 (e.g. three seconds or longer) of the setting switch 68 is effected in D2 direction, the buzzer 71 sounds once, and the setting mode for the load mode is established (step S83). In step S83, the speed indicator 64 blinks while displaying "2". Each pushing operation E4 in D2 direction of the setting switch 64 causes the speed indicator 64 to repeat in cycles the state of blinking while displaying "2", a state of blinking while displaying "3" and a state of blinking while displaying "4".

When, in step S83, a long pushing operation E5 (e.g. three seconds or longer) of the setting switch 68 is effected in D2 direction, the buzzer 71 sounds once, the number ("2", "3" or "4") then displayed on the speed indicator 64 is set as the width of the automatic shifting range R of the load mode, and the speed indicator 64 becomes a continuously lit state (step S84).

When, in the state noted above where the setting mode for the first automatic deceleration control is unestablished (step S82), a long pushing operation E6 (e.g. three seconds or longer) of the setting switch 68 is effected in D2 direction, the buzzer 71 sounds once, and the setting mode for the first automatic deceleration control is established (step S85). In step S85, the speed indicator 64 blinks while displaying "0". Each pushing operation E7 in D2 direction of the setting switch 64 causes the speed indicator 64 to repeat in cycles the state of blinking while displaying "0", a state of blinking while displaying "1", a state of blinking while displaying "2" and a state of blinking while displaying "3".

When, in step S85, a long pushing operation E8 (e.g. three seconds or longer) of the setting switch 68 is effected in D2 direction, the buzzer 71 sounds once, the number ("0", "1", "2" or "3") then displayed on the speed indicator 64 is set as the first predetermined deceleration number of speeds, and the speed indicator 64 becomes a continuously lit state (step S86). In this case, when "0" is set as the first predetermined deceleration number of speeds, the first automatic deceleration control will not be performed.

When, with the shift lever 28 placed in the neutral position N, and after pushing the setting switch 68 to the run mode position (in D1 direction), a long pushing operation E9 (e.g. three seconds or longer) of the setting switch 68 is effected in D1 direction, the buzzer 71 sounds once, and the speed indicator 64 blinks while displaying "r" indicating a setting mode for the run mode (step S87). In this state, the setting mode for the run mode remains unestablished. A pushing operation E10 in D1 direction of the setting switch 64 causes the speed indicator 64 to blink while displaying "A" indicating a setting mode for the second automatic deceleration control (step S88) (the setting mode for the second automatic deceleration control also being unestablished).

In the state noted above where the setting mode for the run mode is unestablished (step S87) and the setting mode for the second automatic deceleration control also unestablished (step S88), each push operation E10 in D1 direction of the setting switch 64 causes an alternate display of the unestablished state of the setting mode for the run mode (step S87) and the unestablished state of the setting mode for the second automatic deceleration control (step S88).

When, in the state noted above where the setting mode for the run mode is unestablished (step S87), a long pushing operation E11 (e.g. three seconds or longer) of the setting switch 68 is effected in D1 direction, the buzzer 71 sounds once, and the setting mode for the run mode is established (step S89). In step S89, the speed indicator 64 blinks while displaying "2". Each pushing operation E12 in D1 direction of the setting switch 64 causes the speed indicator 64 to repeat in cycles the state of blinking while displaying "2", a state of blinking while displaying "3" and a state of blinking while displaying "4".

When, in step S89, a long pushing operation E13 (e.g. three seconds or longer) of the setting switch 68 is effected in D1 direction, the buzzer 71 sounds once, the number ("2", "3" or "4") then displayed on the speed indicator 64 is set as the width of the automatic shifting range R of the run mode, and the speed indicator 64 becomes a continuously lit state (step S90).

When, in the state noted above where the setting mode for the second automatic deceleration control is unestablished (step S88), a long pushing operation E14 (e.g. three seconds or longer) of the setting switch 68 is effected in D1 direction, the buzzer 71 sounds once, and the setting mode for the second automatic deceleration control is established (step S91). In step S91, the speed indicator 64 blinks while displaying "0". Each pushing operation E15 in D1 direction of the setting switch 64 causes the speed indicator 64 to repeat in cycles the state of blinking while displaying "0", a state of blinking while displaying "1", a state of blinking while displaying "2" and a state of blinking while displaying "3".

When, in step S91, a long pushing operation E16 (e.g. three seconds or longer) of the setting switch 68 is effected in D1 direction, the buzzer 71 sounds once, the number ("0", "1", "2" or "3") then displayed on the speed indicator 64 is set as the second predetermined deceleration number of speeds, and the speed indicator 64 becomes a continuously lit state (step S92). In this case, when "0" is set as the second predetermined deceleration number of speeds, the second automatic deceleration control will not be performed.

Figure 11:
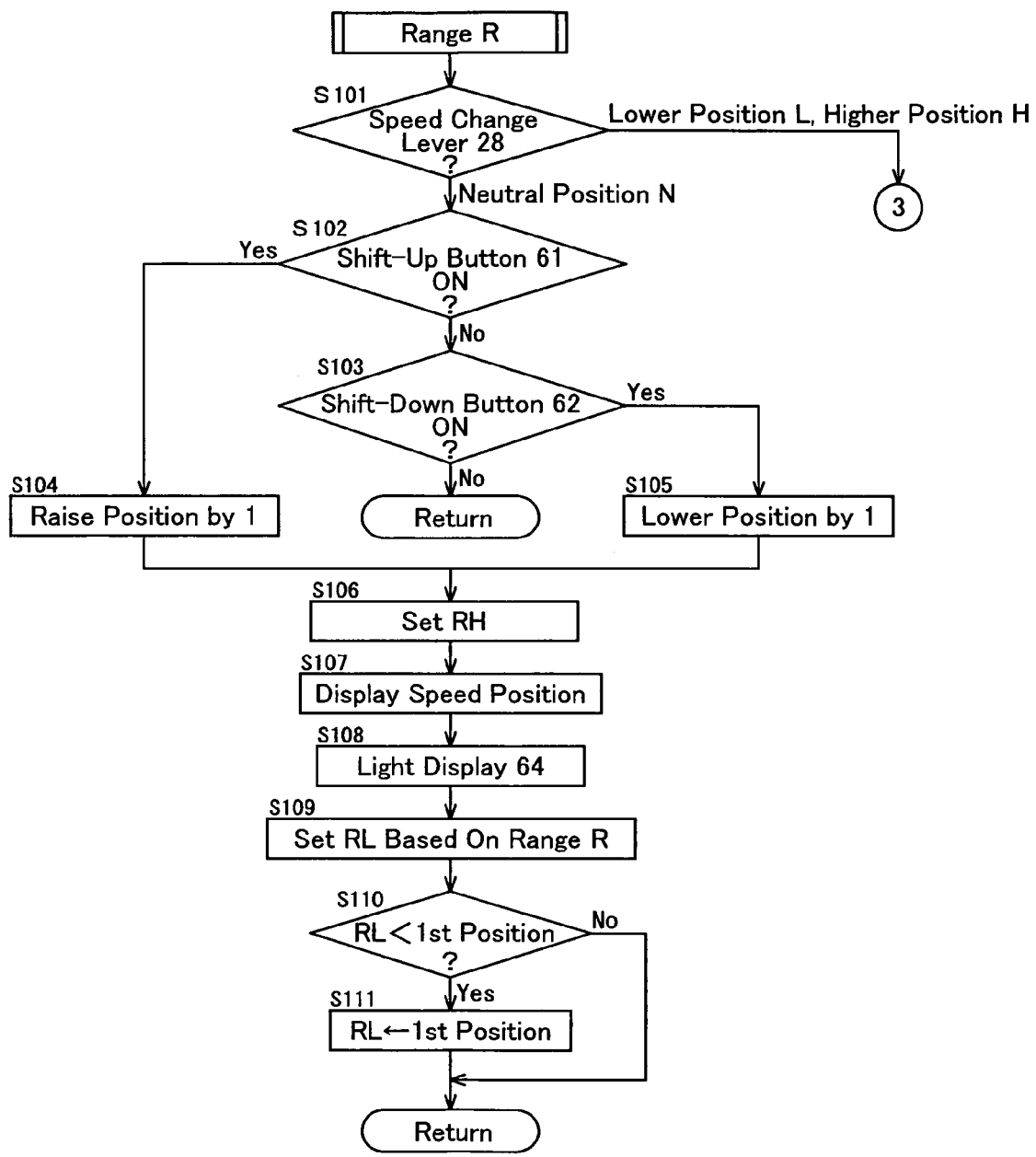
FIG. 11 is a view showing the first half of a flow of control for changing the automatic speed change range in the load mode (run mode)

[13]
The first half of changing of the automatic shifting range R of the load mode (or run mode) described in sections [7], [8] and [9] hereinbefore will be described next with reference to FIG. 11 (the width of the automatic shifting range R of the load mode (or run mode) described in section [12] above being maintained).

When, with the setting switch 68 pushed to the load mode position (or run mode position) and the shift lever 28 operated to the neutral position N (step S101), the up-shift button 61 is pushed (step S102), the first and second main speed change devices 10 and 11 are operated for a next higher speed (step S104). When the down-shift button 62 is pushed in the same state (step S103), the first and second main speed change devices 10 and 11 are operated to a next lower speed (step S105). In this case, operations as in steps S13, S14, S16, S17 and S19 in FIG. 5 are not performed, One of the first to fourth speed clutches 21-24 providing the current speed position of the first and second main speed change devices 10 and 11 is immediately disengaged, and a different one of the first to fourth speed clutches 21-24 is immediately engaged to provide a next higher speed (or a next lower speed) position of the first and second main speed change devices 10 and 11.

When the first and second main speed change devices 10 and 11 are operated for a next higher speed (or a next lower speed) as described above, the shift position of the first and second main speed change devices 10 and 11 resulting from the operation is set as the high speed limit position RH in the automatic shifting range R of the load mode (or run mode) (step S106). The shift position of the first and second main speed change devices 10 and 11 (the high speed limit position RH in the automatic shifting range R of the load mode (or run mode)) is displayed on the speed indicator 64 (step S107), and the speed indicator 64 is lit (step S108).

When the high speed limit position RH in the automatic shifting range R of the load mode (or run mode) has been set, the low speed limit position RL in the automatic shifting range R of the load mode (or run mode) is set next based on the width of the automatic shifting range R of the load mode (or run mode) as described in section [12] hereinbefore (step S109). When, for example, the fourth speed position is set as the high speed limit position RH of the automatic shifting range R of the load mode (or run mode), and the width of the automatic shifting range R of the load mode (or run mode) is three stages, the second speed position is set as the low speed limit position RL of the automatic shifting range R of the load mode (or run mode). In this case, where the low speed limit position RL of the automatic shifting range R of the load mode (or run mode) becomes lower than the first speed position (step S110), the first speed position is set as the low speed limit position RL of the automatic shifting range R of the load mode (or run mode) (step S111).

Figure 12:
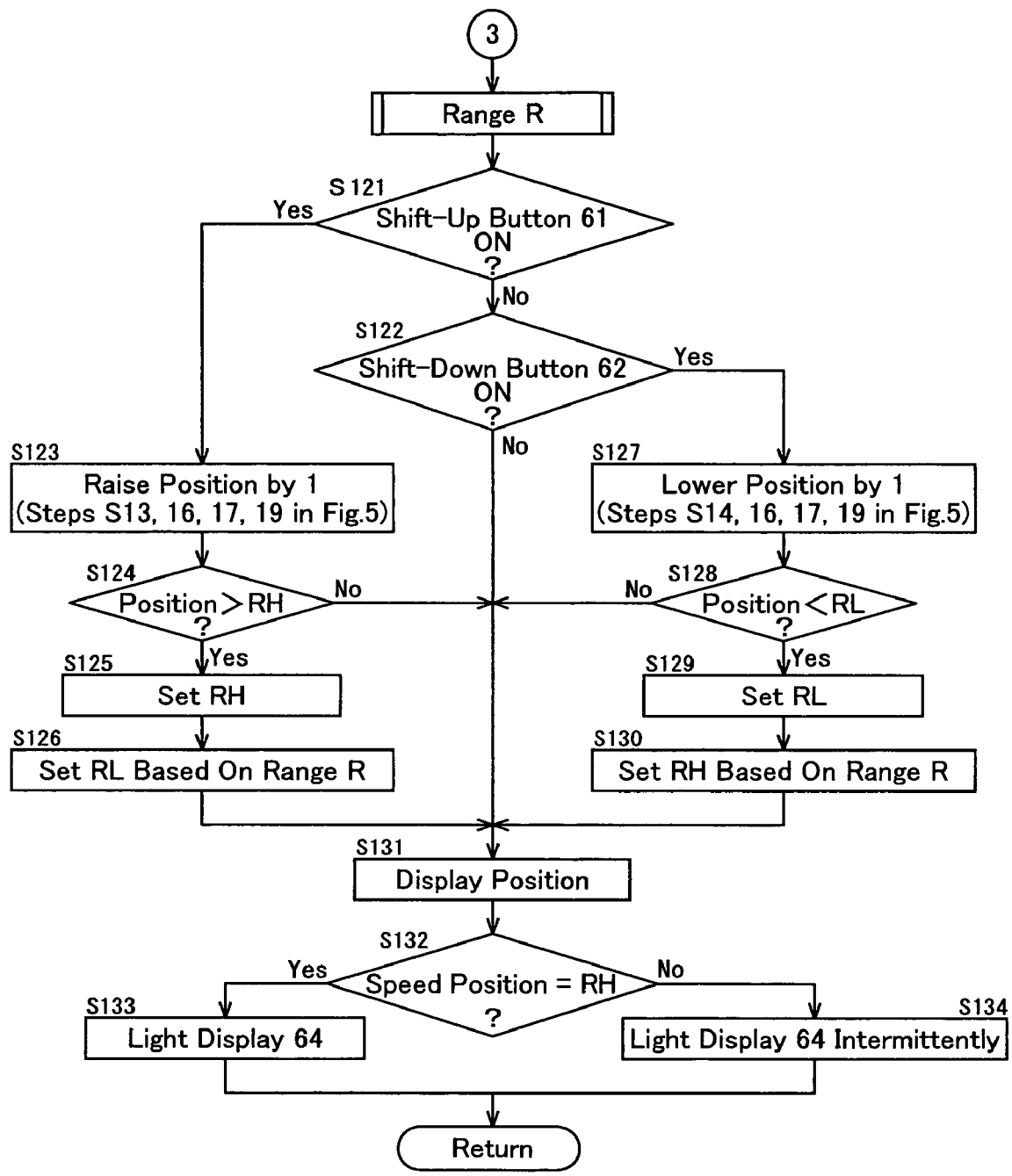
FIG. 12 is a view showing the second half of the flow of control for changing the automatic speed change range in the load mode (run mode)

[14]
The second half of changing of the automatic shifting range R of the load mode (or run mode) described in sections [7], [8] and [9] hereinbefore will be described next with reference to FIGS. 11 and 12 (the width of the automatic shifting range R of the load mode (or run mode) described in section [12] above being maintained).

When, with the setting switch 68 pushed to the load mode position (or run mode position) and the shift lever 28 operated to the low speed position L or high speed position H (step S101), the up-shift button 61 is pushed (step S121), steps S13, S16, S17 and S19 in FIG. 5 are executed to operate the first and second main speed change devices 10 and 11 for a next higher speed (step S123), overriding the states described in sections [7], [8] and [9] hereinbefore (the states of the first and second main speed change devices 10 and 11 being operated to the low speed side and high speed side in the automatic shifting range R of the load mode (or run mode)).

When the down-shift button 62 is pushed in the same state (step S122), steps S14, S16, S17 and S19 in FIG. 5 are executed to operate the first and second main speed change devices 10 and 11 for a next lower speed (step S127), overriding the states described in sections [7], [8] and [9] hereinbefore (the states of the first and second main speed change devices 10 and 11 being operated to the low speed side and high speed side in the automatic shifting range R of the load mode (or run mode)).

When the up-shift button 61 and down-shift button 62 are pushed, the shift positions of the first and second main speed change devices 10 and 11 are displayed on the speed indicator 64 (step S131). When the shift position of the first and second main speed change devices 10 and 11 resulting from the operation is the high speed limit position RH in the automatic shifting range R of the load mode (or run mode), the speed indicator 64 is lit (steps S132 and S133). When the shift position of the first and second main speed change devices 10 and 11 resulting from the operation is not the high speed limit position RH in the automatic shifting range R of the load mode (or run mode), the speed indicator 64 is blinked (steps S132 and S134).

When, with the shift position of the first and second main speed change devices 10 and 11 being the high speed limit position RH in the automatic shifting range R of the load mode (or run mode), the up-shift button 61 is pushed to operate the first and second main speed change devices 10 and 11 are operated to a next higher speed, the shift position of the first and second main speed change devices 10 and 11 will deviate to the high speed side from the automatic shifting range R of the load mode (or run mode). In such a state (steps S121, S123 and S124), the shift position of the first and second main speed change devices 10 and 11 resulting from the operation is set as the high speed limit position RH in the automatic shifting range R of the load mode (or run mode) (step S125).

Next, the low speed limit position RL in the automatic shifting range R of the load mode (or run mode) is set based on the width of the automatic shifting range R of the load mode (or run mode) as described in section [12] hereinbefore (step S126). When, for example, the fourth speed position is set from the third speed position as the high speed limit position RH of the automatic shifting range R of the load mode (or run mode), and the width of the automatic shifting range R of the load mode (or run mode) is three stages, the second speed position is set from the first speed position as the low speed limit position RL of the automatic shifting range R of the load mode (or run mode) (which corresponds to the state where, with the first and second main speed change devices 10 and 11 in the high speed limit position in the automatic shifting range R of the load mode (or run mode), the first and second main speed change devices 10 and 11 are operated to the high speed side whereby the entire automatic shifting range R of the load mode (or run mode) is moved to the high speed side).

When, with the shift position of the first and second main speed change devices 10 and 11 being the low speed limit position RL in the automatic shifting range R of the load mode (or run mode), the down-shift button 61 is pushed to operate the first and second main speed change devices 10 and 11 are operated to a next lower speed, the shift position of the first and second main speed change devices 10 and 11 will deviate to the low speed side from the automatic shifting range R of the load mode (or run mode). In such a state (steps S122, S127 and S128), the shift position of the first and second main speed change devices 10 and 11 resulting from the operation is set as the low speed limit position RL in the automatic shifting range R of the load mode (or run mode) (step S 129).

Next, the high speed limit position RH in the automatic shifting range R of the load mode (or run mode) is set based on the width of the automatic shifting range R of the load mode (or run mode) as described in section [12] hereinbefore (step S126). When, for example, the first speed position is set from the second speed position as the low speed limit position RL of the automatic shifting range R of the load mode (or run mode), and the width of the automatic shifting range R of the load mode (or run mode) is three stages, the fourth speed position is set from the third speed position as the high speed limit position RH of the automatic shifting range R of the load mode (or run mode) (which corresponds to the state where, with the first and second main speed change devices 10 and 11 in the low speed limit position in the automatic shifting range R of the load mode (or run mode), the first and second main speed change devices 10 and 11 are operated to the low speed side whereby the entire automatic shifting range R of the load mode (or run mode) is moved to the low speed side).

Next, the shift position of the first and second main speed change devices 10 and 11 resulting from the operation is displayed on the speed indicator 64 (step S131). When the shift position of the first and second main speed change devices 10 and 11 resulting from the operation is the high speed limit position RH in the automatic shifting range R of the load mode (or run mode), the speed indicator 64 is lit (steps S132 and S133). When the shift position of the first and second main speed change devices 10 and 11 resulting from the operation is not the high speed limit position RH in the automatic shifting range R of the load mode (or run mode), the speed indicator 64 is blinked (steps S132 and S134).

First Modified Embodiment

As shown in preceding section [10] and FIG. 13, when the sensitivity adjusting switch 76 is in the operation range H4, the second preset value N12 is set to "0". Instead, the second preset value N12 (solid line A5) in the operation range H3 may be extended linearly to "0" (for example the left end of the operation range H4 in FIG. 13 is "0"). With this modification, even when the sensitivity adjusting switch 76 is operated to the operation range H4, an "operation range to the high speed side" is set.

Second Modified Embodiment

Instead of setting the first and second preset values N11 and N12 with one sensitivity adjusting switch 76 as described in preceding section [10], a sensitivity adjusting switch 76 for exclusive use in setting and changing the first preset value N11 may be provided along with a sensitivity adjusting switch 76 for exclusive use in setting and changing the second preset value N12. In this way, the first and second preset values N11 and N12 may be set and changed independently of each other.

Third Modified Embodiment

The auxiliary speed change device 12 shown in FIG. 1 may include, as does the second main speed change device 11, a low-speed clutch (not shown) and a high-speed clutch (not shown) of the hydraulically operable multi-plate type arranged in parallel. Electromagnetic proportional valves (not shown) may be provided for the low-speed and high-speed clutches of the auxiliary speed change device 12, respectively. With this construction, the first and second main speed change devices 10 and 11 and auxiliary speed change device 12 together provide first to 16th speeds. By pushing the up-shift button 61 and down-shift button 62, the first and second main speed change devices 10 and 11 and auxiliary speed change device 12 may be shifted to the first to 16th speed positions.

Fourth Modified Embodiment

The first and second main speed change devices 10 and 11 shown in FIG. 1 are constructed as the hydraulic clutch type. The first and second main speed change devices 10 and 11 may be constructed, as is the auxiliary speed change device 12, the speed change gear type with slidable shift elements (not shown). The shift elements may be slid by hydraulic cylinders (not shown).

This invention is applicable also to a work vehicle with first and second main speed change devices 10 and 11 providing ten speeds or six speeds, a work vehicle with auxiliary speed change device 12 shiftable to a high-speed position, an intermediate speed position and a low-speed position, and a work vehicle with first and second main speed change devices 10 and 11 constructed as stepless transmissions of the hydrostatic type of the belt type.

Fifth Modified Embodiment

Figure 14:
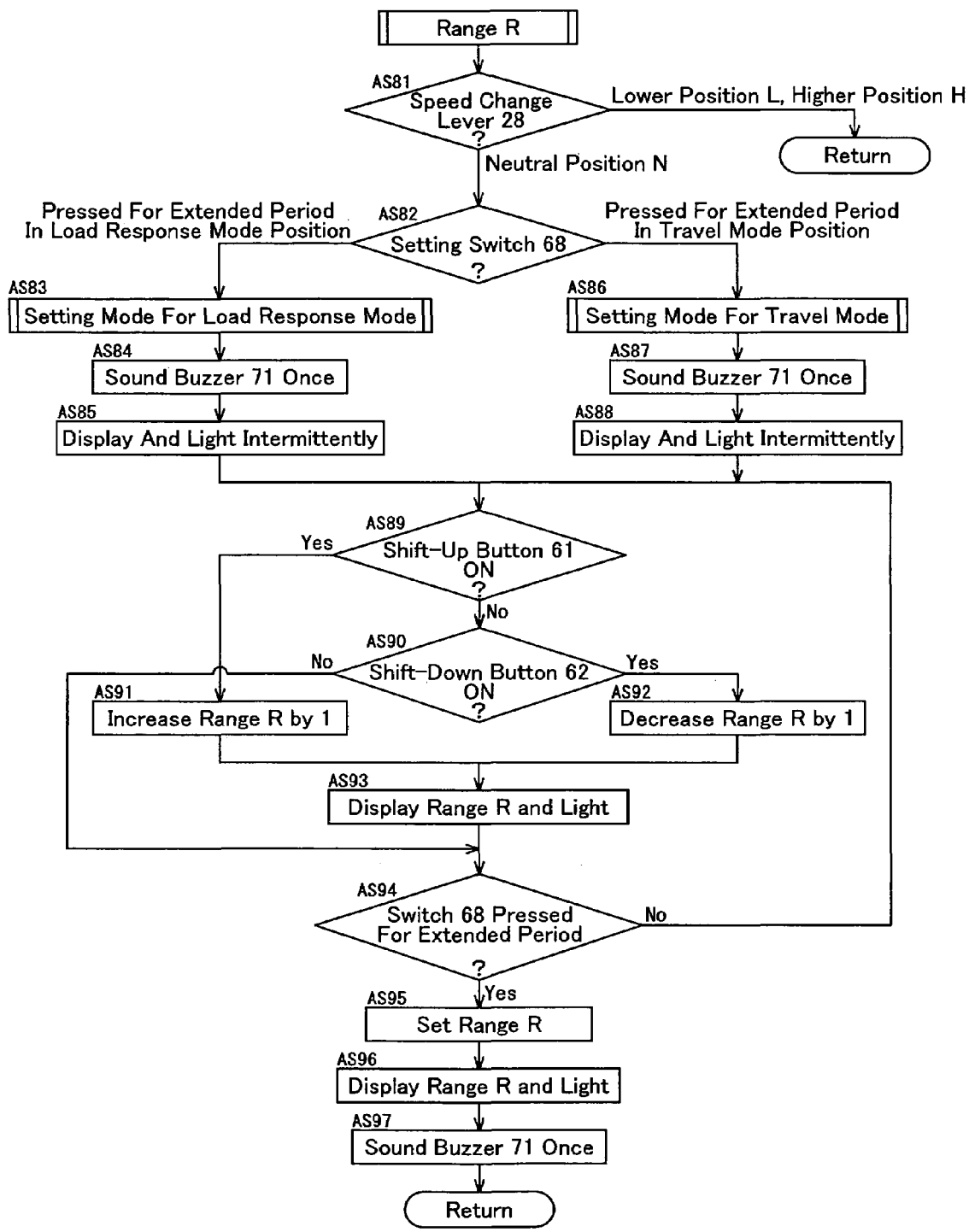
FIG. 14 a view showing a flow of control for setting an automatic speed change range in the load mode (run mode) in a different embodiment.

Another modified embodiment will be described next with reference to FIG. 14. The embodiment relates to a method of setting the width of the automatic shifting range R of the load mode (run mode) described in sections [7], [8] and [9] to two stages, three stages or four stages.

When, with the shift lever 28 placed in the neutral position N (step AS81) and the setting switch 68 pushed to the load mode position, a long pushing operation (e.g. three seconds or longer) of the setting switch 68 is effected in D2 direction (FIG. 2) (step AS82), a setting mode for the load mode is set (step AS83), the buzzer 71 sounds once (step AS84), and the speed indicator 64 blinks while displaying "L" indicating the setting mode for the load mode (step AS85).

When, with the shift lever 28 placed in the neutral position N (step AS81) and the setting switch 68 pushed to the run mode position, a long pushing operation (e.g. three seconds or longer) of the setting switch 68 is effected in D1 direction (FIG. 2) (step AS82), a setting mode for the run mode is set (step AS86), the buzzer 71 sounds once (step AS87), and the speed indicator 64 blinks while displaying "d" indicating the setting mode for the run mode (step AS88).

When the up-shift button 61 is pushed in the setting mode for the load mode or in the setting mode for the run mode as described above (step AS89), the width of the automatic shifting range R is increased by one stage (e.g. from two stages to three stages) (step AS91). The new width of the automatic shifting range R is displayed on the speed indicator 64 ("2", "3" or "4"), and the speed indicator 64 blinks (step AS93). When the down-shift button 62 is pushed (step AS90), the width of the automatic shifting range R of the load mode (or run mode) is decreased by one stage (e.g. from three stages to two stages) (step AS92). The new width of the automatic shifting range R of the load mode (or run mode) is displayed on the speed indicator 64 ("2", "3" or "4"), and the speed indicator 64 blinks (step AS93).

After a desired width of the automatic shifting range R of the load mode (or run mode) is obtained by pushing the up-shift button 61 and down-shift button 62, the setting switch 68 pushed to the load mode position is further pushed long (e.g. three seconds or longer) in the D2 direction (see FIG. 2) (or the setting switch 68 pushed to the run mode position is further pushed long (e.g. three seconds or longer) in the D1 direction (see FIG. 2)) (step AS94).

As a result, the width of the automatic shifting range R of the load mode (or run mode) is set (step AS95). The speed indicator 64 is lit, displaying the set width of the automatic shifting range R of the load mode (or run mode) ("2", "3" or "4") (step AS96). The buzzer 71 is sounded once (step AS97), to complete the setting mode for the load mode and the setting mode for the run mode. In this way, the width of the automatic shifting range R of the load mode (or run mode) may be set.

Sixth Modified Embodiment

Figure 15:
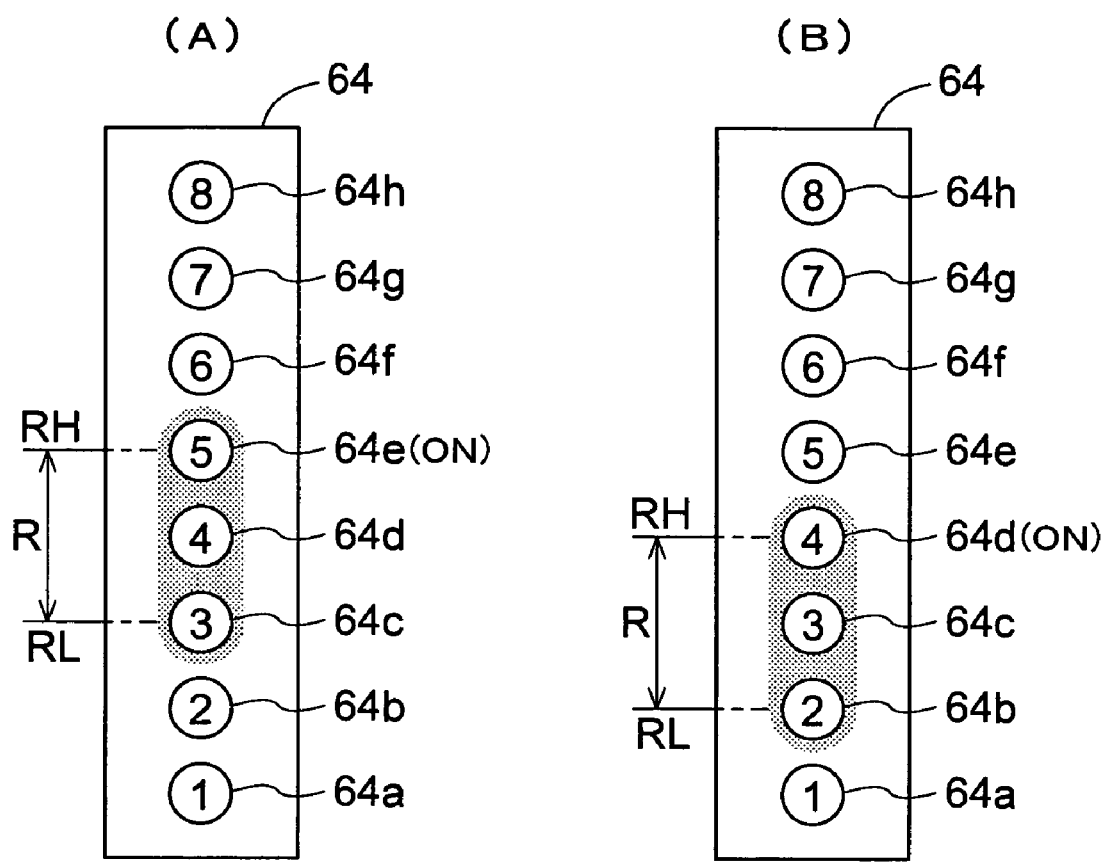
FIG. 15 is a view showing states of a speed indicator in another different embodiment.

The speed indicator 64, instead of being the seven-segment type, may be the liquid crystal type including, as shown in FIG. 15(A), eight indicating elements 64a, 64b, 64c, 64d, 64e, 64f, 64g and 64h corresponding to the first to eighth speed positions.

In this case, the state described in section [13] (i.e. the up-shift button 61 and down-shift button 62 are pushed in the state that the setting switch 68 is pushed to the load mode position (or run mode position, and the shift lever 28 is operated to the neutral position N) is indicated by the speed indicator 64 as shown in FIGS. 15(A) and (B).

As shown in FIG. 15(A), for example, the first and second main speed change devices 10 and 11 are operated to the fifth speed position, and the fifth speed position of the first and second main speed change devices 10 and 11 is set as the high speed limit position RH of the automatic shifting range R of the load mode (or run mode). When the width of the automatic shifting range R of the load mode (or run mode) has three stages, the third speed position of the first and second main speed change devices 10 and 11 is the low speed limit position RL of the automatic shifting range R of the load mode (or run mode). Thus, the indicating elements 64e, 64d and 64c of the speed indicator 64 corresponding to the fifth, fourth and third speed positions are surrounded by a different color as the automatic shifting range R of the load mode (or run mode). The indicating element 64e of the speed indicator 64 corresponding to the fifth speed position is lit. The other indicating elements 64a-64d and 64f-64h of the speed indicator 64 are off.

When the down-shift button 62 is pushed and the first and second main speed change devices 10 and 11 are operated to the fourth speed position, as shown in FIG. 15(B), the fourth speed position of the first and second main speed change devices 10 and 11 is set as the high speed limit position RH of the automatic shifting range R of the load mode (or run mode). The second speed position of the first and second main speed change devices 10 and 11 becomes the low speed limit position RL of the automatic shifting range R of the load mode (or run mode). Thus, the indicating elements 64d, 64c and 64b of the speed indicator 64 corresponding to the fourth, third and second speed positions are surrounded by the different color as the automatic shifting range R of the load mode (or run mode). The indicating element 64d of the speed indicator 64 corresponding to the fourth speed position is lit. The other indicating elements 64a-64c and 64e-64h of the speed indicator 64 are off.

Seventh Modified Embodiment

Where the speed indicator 64 is the liquid crystal type including, as shown in FIG. 16(A), eight indicating elements 64a, 64b, 64c, 64d, 64e, 64f, 64g and 64h corresponding to the first to eighth speed positions, the state described in section [14] (i.e. the up-shift button 61 and down-shift button 62 are pushed in the state that the setting switch 68 is pushed to the load mode position (or run mode position, and the shift lever 28 is operated to the low speed position L or high speed position H) is indicated by the speed indicator 64 as shown in FIGS. 16(A), (B), (C), (D) and (E).

As shown in FIG. 16(A), for example, the first and second main speed change devices 10 and 11 are operated to the fifth speed position, and the fifth speed position of the first and second main speed change devices 10 and 11 is set as the high speed limit position RH of the automatic shifting range R of the load mode (or run mode). When the width of the automatic shifting range R of the load mode (or run mode) has three stages, the third speed position of the first and second main speed change devices 10 and 11 is the low speed limit position RL of the automatic shifting range R of the load mode (or run mode). Thus, the indicating elements 64e, 64d and 64c of the speed indicator 64 corresponding to the fifth, fourth and third speed positions are surrounded by the different color as the automatic shifting range R of the load mode (or run mode). The indicating element 64e of the speed indicator 64 corresponding to the fifth speed position is lit. The other indicating elements 64a-64d and 64f-64h of the speed indicator 64 are off.

When the down-shift button 62 is pushed and the first and second main speed change devices 10 and 11 are operated to the fourth speed position, as shown in FIG. 16(B), the high speed limit position RH (fifth speed position), and low speed limit position RL (third speed position) in the automatic shifting range R of the load mode (or run mode), and the automatic shifting range R of the load mode (or run mode) remain as they are, the indicating element 64d of the speed indicator 64 corresponding to the fourth speed position blinks, and the other indicating elements 64a-64c and 64e-64h of the speed indicator 64 are off. Further, when the down-shift button 62 is pushed and the first and second main speed change devices 10 and 11 are operated to the third speed position, as shown in FIG. 16(C), the indicating element 64c of the speed indicator 64 corresponding to the third speed position blinks, and the other indicating elements 64a, 64b and 64d-64h of the speed indicator 64 are off.

When, as shown in FIG. 16(C), the shift position of the first and second main speed change devices 10 and 11 is the low speed limit position RL (third speed position) of the automatic shifting range R of the load mode (or run mode), and when the down-shift button 62 is pushed and the first and second main speed change devices 10 and 11 are operated to the second speed position, as shown in FIG. 16(D), the second speed position of the first and second main speed change devices 10 and 11 is set as the low speed limit position RL of the automatic shifting range R of the load mode (or run mode), and the fourth speed position of the first and second main speed change devices 10 and 11 is set as the high speed limit position RH of the automatic shifting range R of the load mode (or run mode). The indicating elements 64d, 64c and 64b of the speed indicator 64 corresponding to the fourth, third and second speed position are surrounded by the different color as the automatic shifting range R of the load mode (or run mode). The indicating element 64b of the speed indicator 64 corresponding to the second speed position blinks, and the other indicating elements 64a, 64c-64h of the speed indicator 64 are off.

Figure 16:
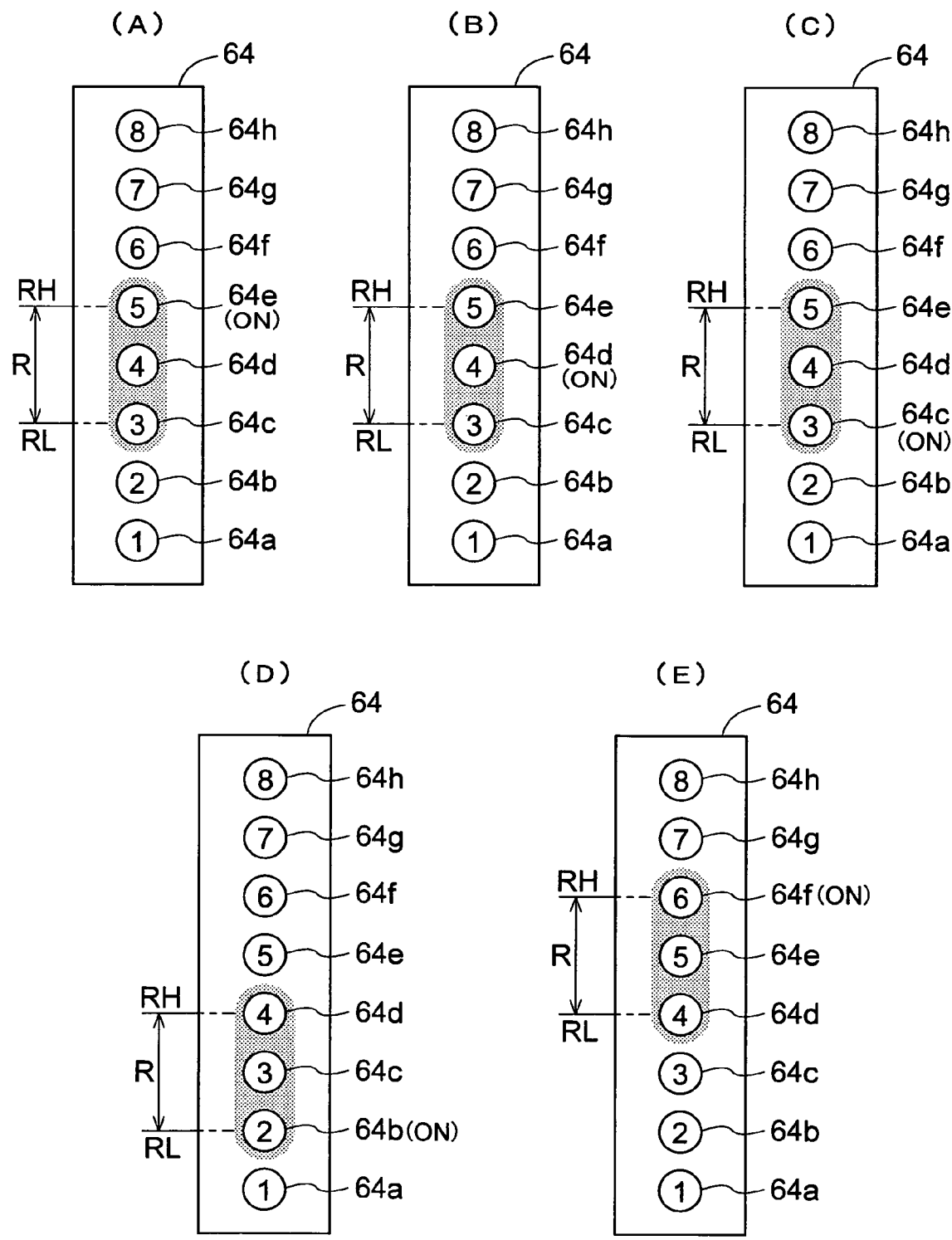
FIG. 16 is a view showing states of a speed indicator in a further embodiment.

When, as shown in FIG. 16(A), the shift position of the first and second main speed change devices 10 and 11 is the high speed limit position RH (fifth speed position) of the automatic shifting range R of the load mode (or run mode), and when the up-shift button 62 is pushed and the first and second main speed change devices 10 and 11 are operated to the sixth speed position, as shown in FIG. 16 (E), the sixth speed position of the first and second main speed change devices 10 and 11 is set as the high speed limit position RH of the automatic shifting range R of the load mode (or run mode), and the fourth speed position of the first and second main speed change devices 10 and 11 is set as the low speed limit position RL of the automatic shifting range R of the load mode (or run mode). The indicating elements 64f, 64e and 64d of the speed indicator 64 corresponding to the sixth, fifth and fourth speed position are surrounded by the different color as the automatic shifting range R of the load mode (or run mode). The indicating element 64f of the speed indicator 64 corresponding to the sixth speed position blinks, and the other indicating elements 64a-64e, 64g and 64h of the speed indicator 64 are off.

What is claimed is:

1. A work vehicle with a speed change device, comprising:
a plurality of wheels including at least one driven wheel;
an engine for driving said at least one driven wheel;
the speed change device provided between said at least one driven wheel and said engine; and
an automatic shifting means for operating said speed change device to a lower speed position within an automatic shifting range defined by a low speed limit position (RL) and a high speed limit position (RH) and for operating said speed change device up to a speed position said speed change device was in before an operation to the lower speed position was effected, in response to load on said engine, said automatic shifting means preventing an automatic shift to a speed position lower than the low speed limit position (RL) and to a speed position higher than the high speed limit position (RH), wherein an entirety of said automatic shifting range is changeable to a low speed side by shifting both the low speed limit position (RL) and the high speed limit position (RH) to the low speed side and is changeable to a high speed side by shifting both the low speed limit position (RL) and the high speed limit position (RH) to the high speed side.

2. A work vehicle as defined in claim 1, further comprising:
a manually operated control; and
a manual shifting means for operating said speed change device based on operation of said manually operated control;
said manual shifting means overriding said automatic shifting means;
wherein, when, with said speed change device operated to a high speed limit position in the automatic shifting range, said speed change device is operated by said manual shifting means to the high speed side, the entirety of the automatic shifting range is changed to the high speed side; and
when, with said speed change device operated to a low speed limit position in the automatic shifting range, said speed change device is operated by said manual shifting means to the low speed side, the entirety of the automatic shifting range is changed to the low speed side.

3. A work vehicle as defined in claim 1, wherein
said automatic shifting range can be widened to include more speed positions or narrowed to include less speed positions.

4. A work vehicle with a speed change device, comprising:
a plurality of wheels including at least one driven wheel;
an engine for driving said at least one driven wheel;
the speed change device provided between said at least one driven wheel and said engine;
a control device for controlling said speed change device, said control device having a control mode for operating said speed change device to a lower speed position and to a higher speed position in an automatic shifting range defined by a low speed limit position (RL) and a high speed limit position (RH), in response to load on said engine, said control device preventing an automatic shift to a speed position lower than the low speed limit position (RL) and to a speed position higher than the high speed limit position (RH); and a manually operated control for shifting an entirety of said automatic shifting range to a lower speed side by shifting both the low speed limit position (RL) and the high speed limit position (RH) to the low speed side and to a higher speed side by shifting both the low speed limit position (RL) and the high speed limit position (RH) to the higher speed side.

5. A work vehicle as defined in claim 4, wherein:

said manually operated control being operable to shift said speed change device;

wherein, when, with said speed change device operated to a high speed limit position in the automatic shifting range, said speed change device is operated by said manual shifting means to the high speed side, the entirety of the automatic shifting range is changed to the high speed side; and when, with said speed change device operated to a low speed limit position in the automatic shifting range, said speed change device is operated by said manual shifting means to the low speed side, the entirety of the automatic shifting range is changed to the low speed side.

6. A work vehicle as defined in claim 4, wherein said automatic shifting range can be widened to include more speed positions or narrowed to include less speed positions.

7. A work vehicle as defined in claim 4, wherein said control device is operable to change the speed change device to a higher position up to a speed position before an operation to the lower speed position was effected.

8. A work vehicle with a speed change device, comprising:

a plurality of wheels including at least one driven wheel;

an engine for driving said at least one driven wheel;

the speed change device disposed between said at least one driven wheel and said engine, the speed change device having a first speed position which is a lowest speed position and a plurality of higher speed positions that are higher speed positions than the first speed position and that includes a highest speed position of the speed change device; and an automatic shifting means for operating said speed change device to a lower speed position within an automatic shifting range defined by a low speed limit position (RL) and a high speed limit position (RH) and for operating said speed change device up to a speed position said speed change device was in before an operation to the lower speed position was effected, in response to load on said engine, the automatic shifting means preventing an automatic shift to a speed position lower than the low speed limit position (RL) and to a speed position higher than the high speed limit position (RH);

wherein said automatic shifting range can be widened to include more speed positions and narrowed to include less speed positions with any one of the plurality of higher speed positions kept within the automatic shifting range.

9. A work vehicle as defined in claim 8, further comprising:

a manually operated control;

a manual shifting means for operating said speed change device based on operation of said manually operated control, wherein a manual mode where said manual shifting means is in operation and an automatic mode where said automatic shifting means is in operation are provided; and a manual selector for manually selecting one of said manual mode and said automatic mode;

wherein said automatic shifting range can be widened to include more speed positions and narrowed to include less speed positions by said manual selector.

10. A work vehicle as defined in claim 8, wherein an entirety of said automatic shifting range is changeable to a low speed side and to a high speed side.

* * * * *